(12) United States Patent
Rossi

(10) Patent No.: US 8,254,580 B2
(45) Date of Patent: Aug. 28, 2012

(54) KEY DISTRIBUTION IN A HIERARCHY OF NODES

(75) Inventor: Angelo Rossi, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 337 days.

(21) Appl. No.: 12/627,526

(22) Filed: Nov. 30, 2009

(65) Prior Publication Data
US 2011/0075847 A1    Mar. 31, 2011

Related U.S. Application Data

(60) Provisional application No. 61/247,338, filed on Sep. 30, 2009.

(51) Int. Cl.
  *H04L 9/08* (2006.01)
  *H04L 29/06* (2006.01)
(52) U.S. Cl. .................... 380/278; 713/163
(58) Field of Classification Search ............... 380/278; 713/163
See application file for complete search history.

(56) References Cited

U.S. PATENT DOCUMENTS

| | | | | |
|---|---|---|---|---|
| 6,226,743 | B1 * | 5/2001 | Naor et al. | 713/177 |
| 6,240,188 | B1 * | 5/2001 | Dondeti et al. | 380/284 |
| 6,275,859 | B1 * | 8/2001 | Wesley et al. | 709/229 |
| 6,397,329 | B1 * | 5/2002 | Aiello et al. | 713/155 |
| 6,993,138 | B1 * | 1/2006 | Hardjono | 380/281 |
| 7,043,024 | B1 * | 5/2006 | Dinsmore et al. | 380/278 |
| 7,315,941 | B2 * | 1/2008 | Ramzan et al. | 713/156 |
| 7,346,170 | B2 * | 3/2008 | Asano et al. | 380/278 |
| 7,400,732 | B2 * | 7/2008 | Staddon et al. | 380/278 |
| 7,483,536 | B2 * | 1/2009 | Kudo | 380/277 |
| 7,512,240 | B2 * | 3/2009 | Lain et al. | 380/277 |
| 7,590,238 | B2 * | 9/2009 | Kamijoh et al. | 380/45 |
| 7,590,247 | B1 * | 9/2009 | Dinsmore et al. | 380/278 |
| 7,593,528 | B2 * | 9/2009 | Kamijoh et al. | 380/45 |

(Continued)

FOREIGN PATENT DOCUMENTS

WO    2005/109735 A1    11/2005

OTHER PUBLICATIONS

Angelo Rossi et al. "An Efficient & Secure Self-Healing Scheme for LKH." May 1, 2010. Springer Science+Business Media, LLC. p. 327-347.*

(Continued)

*Primary Examiner* — Christian Laforgia
(74) *Attorney, Agent, or Firm* — Alex Nicolaescu; Ericsson Canada Inc.

(57) ABSTRACT

Methods, a client node and a key server node are provided for distributing from the key server node, and acquiring at the client node, self-healing encryption keys. The client node and the key server node are part of a key distribution network that comprises a plurality of client nodes. An encryption key is obtained from a combination of a forward key with a backward key, wherein the backward key is distributed at a time separated from the time of the forward key by a self-healing period. The forward and backward keys are updated in a multicast rekey message, at a given time, encrypted by an encryption key defined for a previous time. Optionally, when a sibling of the client node joins or leaves the key distribution network, a unicast rekey message is used to renew the forward and backward keys at the client node.

40 Claims, 11 Drawing Sheets

U.S. PATENT DOCUMENTS

| | | | | |
|---|---|---|---|---|
| 7,599,497 | B2* | 10/2009 | Soppera | 380/279 |
| 7,627,755 | B2* | 12/2009 | Ahonen et al. | 713/163 |
| 7,697,690 | B2* | 4/2010 | Fu et al. | 380/277 |
| 7,739,492 | B2* | 6/2010 | Kamijo | 713/150 |
| 7,757,082 | B2* | 7/2010 | Asano | 713/163 |
| 7,774,598 | B2* | 8/2010 | Chmora et al. | 713/163 |
| 7,813,510 | B2* | 10/2010 | Fu | 380/279 |
| 7,848,525 | B2* | 12/2010 | Kim et al. | 380/278 |
| 7,903,820 | B2* | 3/2011 | Waisbard | 380/278 |
| 7,949,135 | B2* | 5/2011 | Lindholm et al. | 380/277 |
| 8,000,472 | B2* | 8/2011 | Suga | 380/45 |
| 8,032,926 | B2* | 10/2011 | Koo et al. | 726/3 |
| 8,045,713 | B2* | 10/2011 | Lain et al. | 380/277 |
| 8,081,754 | B2* | 12/2011 | Huh et al. | 380/44 |
| 2002/0147906 | A1* | 10/2002 | Lotspiech et al. | 713/158 |
| 2004/0017916 | A1* | 1/2004 | Staddon et al. | 380/277 |
| 2004/0019795 | A1* | 1/2004 | Okaue | 713/189 |
| 2004/0156509 | A1* | 8/2004 | Nakano et al. | 380/281 |
| 2005/0018853 | A1* | 1/2005 | Lain et al. | 380/277 |
| 2006/0059333 | A1* | 3/2006 | Gentry et al. | 713/156 |
| 2006/0129805 | A1* | 6/2006 | Kim et al. | 713/158 |
| 2007/0074036 | A1* | 3/2007 | Ramzan et al. | 713/176 |
| 2008/0013733 | A1* | 1/2008 | Johansson et al. | 380/278 |
| 2008/0085003 | A1* | 4/2008 | Waisbard | 380/277 |
| 2008/0095375 | A1 | 4/2008 | Tateoka et al. | |
| 2009/0310788 | A1* | 12/2009 | Garrido et al. | 380/279 |
| 2011/0026715 | A1* | 2/2011 | Rossi | 380/278 |

OTHER PUBLICATIONS

Zhu, Sencun, et al., "Scalable Group Rekeying for Secure Multicast: A Survey," Springer-Verlag Berlin Heidelberg 2003, pp. 1-10.

Shi, Minghui, et al., "Self-Healing Group-Wise Key Distribution Schemes with Time-Limited Node Revocation for Wireless Sensor Networks," IEEE Wireless Communications, Oct. 2007, pp. 38-46.

Zhu, Sencun, et al., Adding Reliable and Self-healing Key Distribution to the Subset Difference Group Rekeying Method for Secure Multicast, Springer-Verlag Berlin Heidelberg 2003, pp. 107-118.

Jiang, Yixin et al., Self-healing group key distribution with time-limited node revocation for wireless sensor networks, Elsevier, ScienceDirect, Jun. 23, 2006, pp. 14-23.

Du, Chunlai et al., Anti-Collusive Self-Healing Key Distribution Scheme with Revocation Capability, Information Technology Journal 2009, 2009 Asian Network for Scientific Information, Downloaded Apr. 23, 2009, pp. 1-6.

Naor, Dalit et al., Revocation and Tracing Schemes for Stateless Receivers, Feb. 24, 2001, pp. 1-33.

Wallner, D. et al., Key Management for Multicast: Issues and Architectures, Network Working Group, RFC 2627, Jun. 1999, pp. 1-23.

Staddon, Jessica et al., Self-Healing Key Distribution with Revocation, Proceedings of the 2002 IEEE Symposium on Security and Privacy, 2002 IEEE, pp. 1-17.

Wei, Shih-Yi, Self-Healing Schemes and Theorems (1), Downloaded Apr. 23, 2009, pp. 1-21.

Firdous Kausar et al., Secure Group Communication with Self-healing and Rekeying in Wireless Sensor Networks, Springer-Verlag Berlin Heidelberg, Dec. 12, 2007, pp. 737-748.

Asma Khalid et al., A Secure Group Rekeying Scheme With Compromised Node Revocation in Wireless Sensor Networks, Springer-Verlag Berlin Heidelberg, Jun. 25, 2009, pp. 712-721.

Hung-Min Sun et al., An Efficient Rekeying Scheme for Multicast and Broadcast (M&B) in Mobile WiMAX, Proceedings / 2008 IEEE Asia Pacific Services Computing Conference, Dec. 9-12, 2008, Taiwan, pp. 199-204.

Shouzhi Xu et al., An Efficient Batch Rekeying Scheme Based on One-Way Function Tree, International Symposium on Communications and Information Technologies 2005, Oct. 12-14, 2005, Beijing, China, pp. 474-477.

PCT Search Report from corresponding application PCT/IB2010/053289.

* cited by examiner

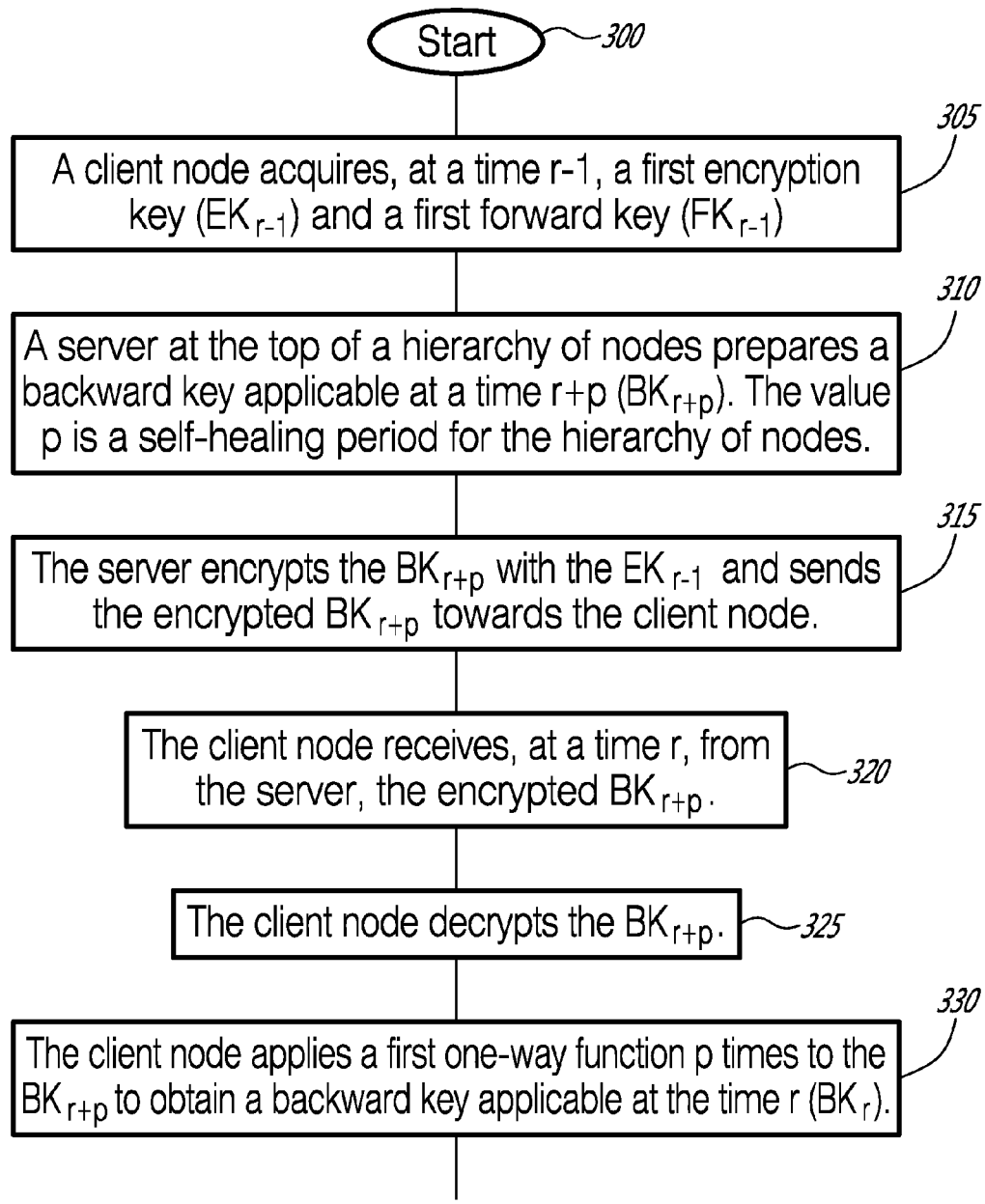

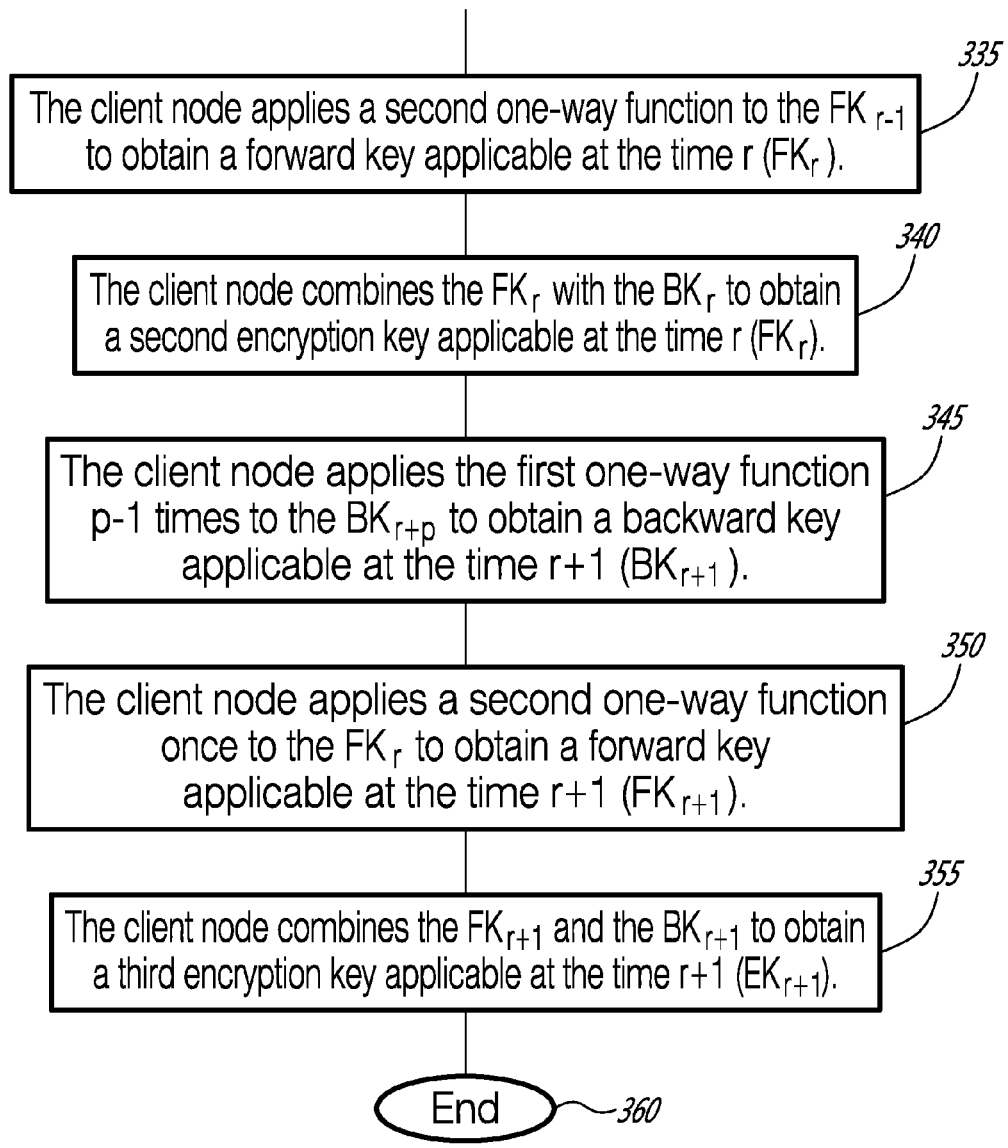
FIG. 3 continue

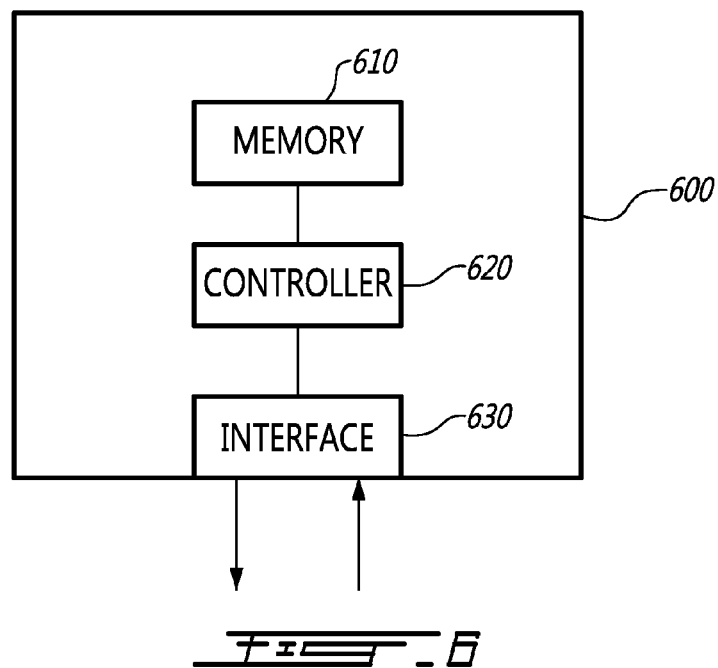
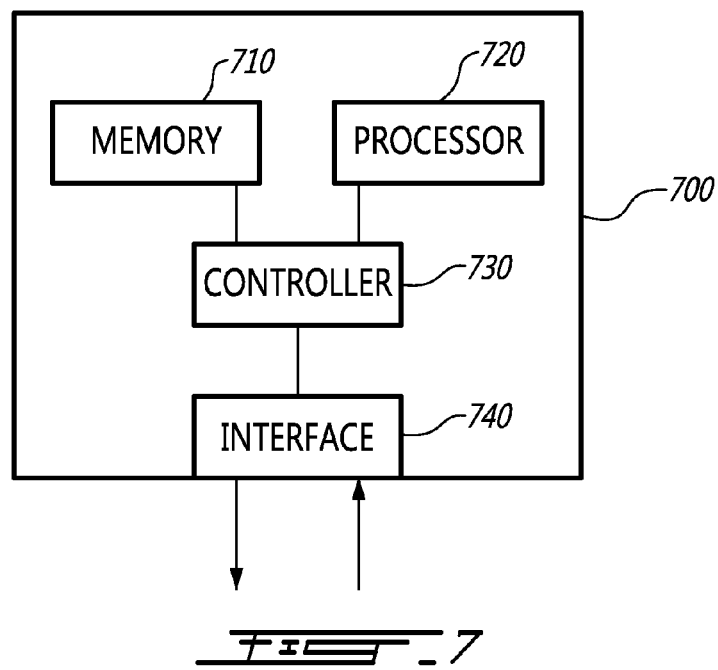

KEY DISTRIBUTION IN A HIERARCHY OF NODES

PRIORITY STATEMENT UNDER 35 U.S.C. S.119(e) & 37 C.F.R. S.1.78

This non-provisional patent application claims priority based upon the prior U.S. provisional patent application entitled "Self-Healing Key Distribution for LKH", application No. 61/247,338, filed Sep. 30, 2009, in the name of Angelo Rossi. The disclosure of Ser. No. 61/247,338 is incorporated herein by reference in its entirety.

TECHNICAL FIELD

The present invention relates generally to the field of communications and, more specifically, to a method, a client node and a server node for distributing keys in a hierarchical network.

BACKGROUND

Multicast transmission consists of sending a same content in the form of packets directed towards multiple recipients simultaneously. Multicast transmission provides important savings in terms of overhead for media distribution, such as for example internet television applications. Multimedia content may be offered for a fee, in which case the content may be encrypted prior to its distribution. Paying subscribers may receive encryption keys for use in decoding multicast content. Because end-users may subscribe to receive a content for a specific period of time, it is necessary to ensure backward and forward content secrecy.

Backward secrecy (BS) is a concept whereby, when a new user is authorized to join a multicast group, he should not be able to decrypt data previously transmitted to that multicast group. For example, if a new user subscribes to a new TV channel, although a multicast flow for this channel may have reached that new user before he subscribed, he should not be able to watch any previously stored data from that channel. Forward secrecy (FS) is a concept whereby, when the user gets revoked from a multicast group, although a multicast flow for that multicast group may continue reaching that user after the revocation, he should not be able to decrypt data received after the revocation. For example, a user can unsubscribe from a TV channel and should therefore be unauthorized (in a timely fashion) from watching it.

Logical Key Hierarchy (LKH) is a statefull rekeying algorithm requiring a key recovery algorithm to provide necessary keys to new users of a multicast group. The key recovery algorithm also allows providing keys to users having missed a rekeying message. LKH uses key encryption keys (KEK), which are keys for encrypting other keys. The concept of using KEKs is based on the fact that LKH uses keys to encrypt a content distributed through the hierarchy. When a new key is generated and is meant to replace a previous key, the new key is distributed encrypted by the previous key acting as a KEK. A logical hierarchical tree is built with a root key and a KEK for each additional level of the hierarchy. When a LKH tree is initially built, time invariant keys of each client node of the tree are initially used as KEKs for distributing, in unicast messages, encryption keys for use in decoding a multicast content. Thereafter, when the encryption keys are updated, a first distributed encryption key may be used as a KEK for distributing a next distributed encryption key. This ensures that no client node may detect a key at any time without first having obtained a first key through legitimate means.

FIGS. 1a, 1b and 1c, collectively referred to as FIG. 1, provide a prior art illustration of how LKH handles events in which users join or leave a binary LKH tree 100. FIG. 1a shows an initial LKH tree 100. The exemplary tree 100 is binary because each pair of client nodes $110_{1-7}$ at the bottom of the tree 100 is connected to an intermediate node $120_{1-3}$, each pair of intermediate node $120_{1-3}$ being connected to one more, higher layer node $130_{1-2}$, until a group key server 140 is found, at least from a logical standpoint, at the top of the hierarchy. The intermediate nodes $120_{1-3}$ and the higher layer nodes $130_{1-2}$ may consist of physical nodes or may alternatively exist only as logical nodes, for example as logical entities implemented within the group key server 140. Because there is an uneven number of client nodes 110 in the exemplary tree 100, client node $110_7$ may be actually directly connected to higher layer node $130_2$. Another manner of implementing the initial LKH tree 100 may be to connect the client node $110_7$ to an intermediate node $120_4$ (shown in FIG. 1b) even though there is in that case only that one client node $110_7$ connected the intermediate node $120_4$. The following description of FIG. 1 assumes, for illustration purposes, that the intermediate node $120_4$ is absent from the initial LKH tree 100 of FIG. 1a. This illustration is not meant to limit the scope of the background art addressed herein. It should also be noted that LKH trees are not limited to binary trees. In a non-binary tree, more than 2 nodes of a given level may connect to a node at an immediately above layer.

Message sequences support a join event in FIG. 1b, and a leave event in FIG. 1c. In the present description of FIG. 1, expressions such as "$K_n$" and "$K_{n\_m}$" represent keys. The expression "$K_a(K_b)$" means that $K_b$ is being distributed, encrypted by use of $K_a$, wherein $K_a$ acts as a KEK. For example, $K_{1\_7}$ is a root key of the group key server 140, and is known by all nodes in the initial binary LKH tree 100 of FIG. 1a. Nodes at a given hierarchical level also have keys, which are known by subordinate nodes. For example, higher layer node $130_2$, has key $K_{5\_7}$, known by client nodes $110_{5-7}$. When user 8 ($110_8$) joins the tree 100 in FIG. 1b, the already existing client node $110_7$ and the new client node $110_8$ become connected through a new intermediate node $120_4$ because the exemplary LKH tree 100 is binary. The higher layer node $130_2$ is essentially unchanged, except for the fact that it requires generation of a new key because it now supports one more client node $110_8$. The indicia within each node at an intermediate or higher level of FIG. 1, for example "5_8" in higher layer node $130_2$, are merely used in the present description as a convenient manner of illustrating which range of client nodes are supported by that intermediate or higher level node. Of course, the group key server 140 supports all client nodes of the LKH tree 100 and thus shows "1_7" in FIG. 1a (supporting client nodes $110_{1-7}$), "1_8" in FIG. 1b (supporting client nodes $110_{1-8}$), and "1_8*" in FIG. 1c (supporting a non-continuous range of client nodes $110_{1-2}$ and $110_{4-8}$). The indicia shown within each node do not represent any key value.

When the client node $110_8$ joins the tree 100 in FIG. 1b, a new $K_{1\_8}$ is randomly generated at the group key server 140, for the group key server itself. $K_{1\_8}$ is sent in a multicast rekey message 150 to previously existing nodes of the tree 100, encrypted by a previously known KEK ($K_{1\_7}$). Because all previously existing nodes on the right hand side of FIG. 1 need to acquire a new key for the higher layer node $130_2$, a new $K_{5\_8}$ is also randomly generated at the group key server 140. $K_{5\_8}$ is sent in the multicast rekey message 150 to previously existing nodes of the tree 100, encrypted by a KEK ($K_{5\_7}$) that is previously known to the client nodes $110_{5-7}$. The content of the multicast rekey message 150 is thus expressed as "$K_{1\_7}(K_{1\_8}), K_{5\_7}(K_{5\_8})$". It may be noted that nodes on the left hand side of the tree 100 do not possess the $K_{5\_7}$ and may simply ignore the $K_{5\_7}(K_{5\_8})$ component of the multicast rekey message 150.

If the intermediate node $120_4$ was not initially present and is now added to the tree 100, a new $K_{78}$ is generated therefor at the group key server 140. $K_{7\_8}$ is sent in a unicast rekey message 152 to the client node $110_7$, encrypted with $K_7$, which a shared key known by the client node $110_7$ and by the group key server 140. The content of the unicast rekey message 152 is thus "$K_7(K_{7\_8})$".

$K_{1\_8}$, $K_{5\_8}$ and $K_{7\_8}$ are also sent in a unicast rekey message 154 to the new node $110_8$, using $K_8$, which a shared key known by the new node $110_8$ and by the group key server 140. The content of the unicast rekey message 154 is thus "$K_8 (K_{1\_8}, K_{5\_8}, K_{7\_8})$".

FIG. 1c depicts the departure of a user of the client node $110_3$. The departure does not necessarily mean that the client node $110_3$ has physically left the tree 100, but rather that he is now unsubscribed and is no longer allowed to receive any content from the tree 100. As a result of this departure, the hierarchy underneath the group key server 140 and the higher layer node $130_1$ may have changed, the client node $110_4$ being now possibly connected directly to the higher layer node $130_1$. Of course, another option (not shown) may involve the intermediate node $120_2$ remaining in the tree 100, with $110_4$ remaining as the sole client node connected thereto. A new $K_{1\_8*}$ and a new $K_{1\_4*}$ are randomly generated by the group key server 140. The $K_{1\_8*}$ and the $K_{1\_4*}$ are distributed to all remaining nodes of the tree 100 by use of a multicast rekey message 156, with the exception of the node $110_4$ that receives a unicast rekey message 158. The client node $110_4$ receives the new $K_{1\_8*}$ and the new $K_{1\_4*}$ directed by the unicast rekey message 158, encrypted with $K_4$, which a shared key known by the client node $110_4$ and by the group key server 140. The content of the unicast rekey message 158 is thus expressed as "$K_4(K_{1\_8*}, K_{1\_4*})$". The content of the multicast rekey message 156 is "$K_{5\_8}(K_{1\_8*}), K_{1\_2}(K_{1\_8*}, K_{1\_4*})$". It should be noted that none of the messages of FIG. 1c is decryptable by the departed node $110_3$, even though that node might still be sniffing packets transmitted in the tree 100. This is because all rekey messages are encrypted by keys unknown to node $110_3$.

While FIG. 1 shows that key generation may be event-based, for example when a new user joins or when an existing user leaves, key regeneration may also be time-based, in a process commonly known as periodic batch rekeying.

The LKH architecture has some inherent deficiencies in that errors in the reception of a rekey message at a client node may render this client node incapable of decoding incoming multicast content. This deficiency is especially apparent when the architecture is used in wireless networks because such networks are prone to frequent transmission errors. As an example, the client node $110_5$ of FIG. 1 is a satellite TV decoder. Because of some weather condition, the client node $110_5$ may miss receiving the multicast rekey message 150 of FIG. 1b, which was sent when the client node $110_8$ had joined the tree 100. As a result, $110_5$ does not have the keys $K_{5\_8}$ and $K_{1\_8}$ and is therefore unable to decrypt later content encrypted with the group key $K_{1\_8}$. The algorithm for LKH does have a key recovery mechanism. However, while this mechanism effectively resends the necessary keys for an authorized client node having missed a rekey message, upon request from that client node, this mechanism is slow and adds delays to receiving subscribed content by the client node.

SUMMARY

It is therefore a broad object of this invention to provide methods, a client node and a server node for distributing and acquiring encryption keys in a key hierarchy of nodes.

A first aspect of the present invention is directed a method of acquiring encryption keys in a hierarchy of nodes. The method starts when a client node acquires, at a time r−1, a first encryption key ($EK_{r-1}$) and a first forward key ($FK_{r-1}$). The client node later receives, from a key server, at a time r, a backward key applicable at a time r+p ($BK_{r+p}$). The received $BK_{r+p}$ is encrypted with the $EK_{r-1}$. The value p is a period defined for the hierarchy of nodes. The client node applies a first one-way function p times to the $BK_{r+p}$ to obtain a backward key applicable at the time r ($BK_r$). The client node also applies a second one-way function to the $FK_{r-1}$ to obtain a backward key applicable at the time r ($FK_r$). The client node then combines the $FK_r$ with the $BK_r$ to obtain a second encryption key applicable at the time r ($EK_r$).

A second aspect of the present invention is directed to a method of distributing encryption keys in a hierarchy of nodes. The method starts when a key server for the hierarchy of nodes receives, at a time s, an indication that a first client node has joined or left the hierarchy of nodes. Responsive to the indication, the key server defines a forward key applicable at the time s ($FK_s$) and a backward key applicable at a time s+p ($BK_{s+p}$). The forward key is defined such that applying a first one-way function to the $FK_s$ generates a forward key for a time s+1 ($FK_{s+1}$). The backward key is defined such that applying a second one-way function to the $BK_{s+p}$ generates a backward key for a time s+p−1 ($BK_{s+p-1}$). The value p is a period defined for the hierarchy of nodes. The server then sends towards a second client node a unicast rekey message comprising the $FK_s$ and the $BK_{s+p}$. The content of the unicast rekey message is encrypted with a time invariant key of the second client node.

A third aspect of the present invention is directed to a client node in a hierarchy of nodes, the client node acquiring encryption keys. The client node comprises a memory that stores encryption keys, an interface that communicates with other nodes of the hierarchy of nodes, and a controller. The controller controls the memory and the interface. The controller also acquires, at a time r−1, a first encryption key ($EK_{r-1}$) and a first forward key ($FK_{r-1}$). The controller then receives, from a key server, at a time r, a backward key applicable at a time r+p ($BK_{r+p}$), the $BK_{r+p}$ being encrypted with the $EK_{r-1}$, p being a period defined for the hierarchy of nodes. The controller applies a first one-way function p times to the $BK_{r+p}$ to obtain a backward key applicable at the time r ($BK_r$). The controller also applies a second one-way function to the $FK_{r-1}$ to obtain a backward key applicable at the time r ($FK_r$) The controller then combines the $FK_r$ with the $BK_r$ to obtain a second encryption key applicable at the time r ($EK_r$ r).

A fourth aspect of the present invention is directed to a key server node for distributing encryption keys in a hierarchy of nodes. The key server node comprises a processor that generates forward key (FK) chains and backward key (BK) chains, a memory that stores encryption keys, an interface that communicates with client nodes of the hierarchy of nodes, and a controller. The controller controls the processor, the memory and the interface. The controller also receives through the interface, at a time s, an indication that a first client node has joined or left the hierarchy of nodes. Responsive to the indication, the controller instructs the processor to define a forward key applicable at the time s ($FK_s$) and a backward key applicable at a time s+p ($BK_{s+p}$). The forward key is defined such that applying a first one-way function to the $FK_s$ generates a forward key for a time s−1 ($FK_{s+1}$). The backward key is defined such that applying a second one-way function to the $BK_{s+p}$ generates a backward key for a time s+p−1 ($BK_{s+p-1}$). The value p is a period defined for the hierarchy of nodes. The controller stores the $FK_s$ and the $BK_{s+p}$ in the memory. The controller also reads from the memory a time invariant key of a second client node. The controller then instructs the interface to send towards the second client node a unicast rekey message comprising the $FK_s$ and the $BK_{s+p}$, the unicast rekey message being encrypted with the time invariant key of the second client node.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3 illustrates an exemplary method of acquiring encryption keys at a client of a hierarchy of nodes;

FIG. 6 shows an exemplary client node according to an aspect of the present invention; and FIG. 7 shows an exemplary key server node according to an aspect of the present invention.

DETAILED DESCRIPTION

Figure 1A:
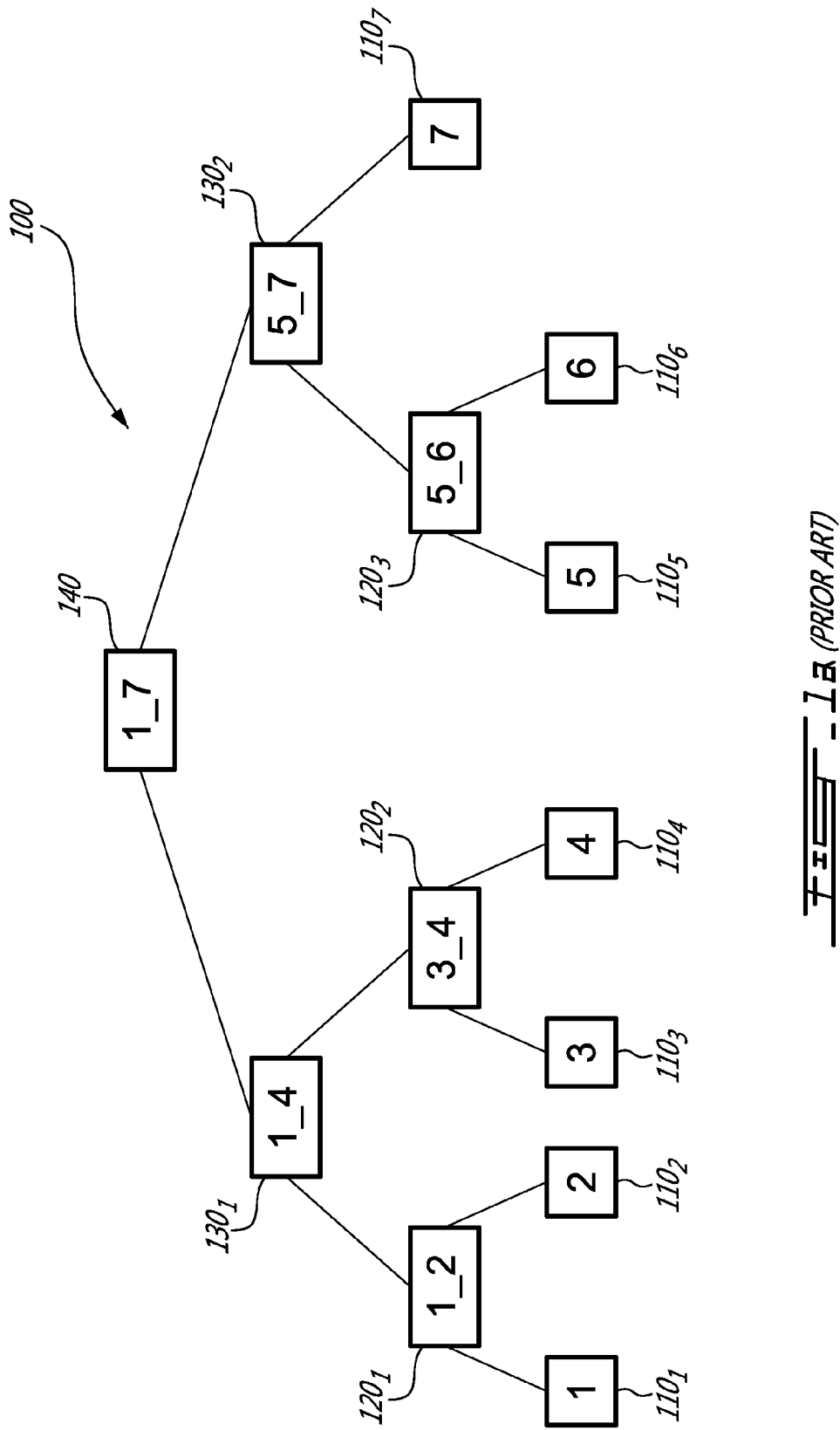
FIGS. 1a, 1b and 1c provide a prior art representation of how logical key hierarchy handles events in which users join or leave a binary logical key hierarchy tree.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention is related to co-pending U.S. application Ser. No. 12/533,734, entitled "SELF-HEALING ENCRYPTION KEYS", from the same inventor and assigned to the same assignee as the present invention. The disclosure of Ser. No. 12/533,734 is incorporated herein by reference in its entirety.

The present invention provides a method and nodes for distributing, from a key server, towards client nodes, self healing encryption keys. The key server may be considered, at least from a logical standpoint, as placed at the top of a logical key hierarchy (LKH) distribution network. In practice, some of the various nodes in the hierarchy may only be logical nodes within other physical nodes of the distribution network. In some embodiments, intermediate nodes located in the hierarchy between the key server and the client nodes may be realized as logical entities within the key server. The key server itself, or an associate content server, distributes user content, for example an on-demand TV program, towards the client nodes. Often times, the distributed content is offered for a fee and the client nodes subscribe to the content distribution service in order to obtain this content. For efficiency reasons, the content is multicasted, implying that the content is sent on a medium that can be received by subscribed and unsubscribed users alike. Encryption keys are distributed to subscribers so that only they can properly decode the content. Because the content is multicasted, it needs to be encrypted by a common key or by a common set of keys that all subscribers already have obtained.

Renewed encryption keys are distributed in the LKH network in a so-called rekey process. Rekey messages may be distributed at regular intervals, or when users join or leave the network, or in both instances. Because transmission errors may occur in the LKH network, the present invention introduces a self-healing property to the rekey process. Self-healing provides a legitimate user of a client node, having missed a rekey message, with a method for regenerating missing keys for a defined, self-healing period. The present invention additionally provides optional methods for allowing a client node joining the LKH network efficiently to receive new keys without getting access to previous keys. Likewise, the present invention optionally proposes that when a client node leaves the LKH network, a rekey process provides new keys to the remaining client nodes while preventing the departed client node from continuing to decode any content received after the client's departure.

If transmission errors continue for a period longer than the self-healing period and if no new, decryptable rekeying message has been received by a client node, the client needs to invoke a key recovery with the key server, using well-known processes. A carefully selected self-healing period duration may reduce the occurrences of these key recovery events.

In the context of the present invention, a client node may comprise a mobile cellular telephone, a mobile node, a digital personal assistant, a laptop computer, an IP television receiver, a cable TV decoder, a satellite TV receiver, a gaming device, and the like. The key server may be standalone and work in coordination with a separate content server, or may be combined with the content server.

Figure 2:
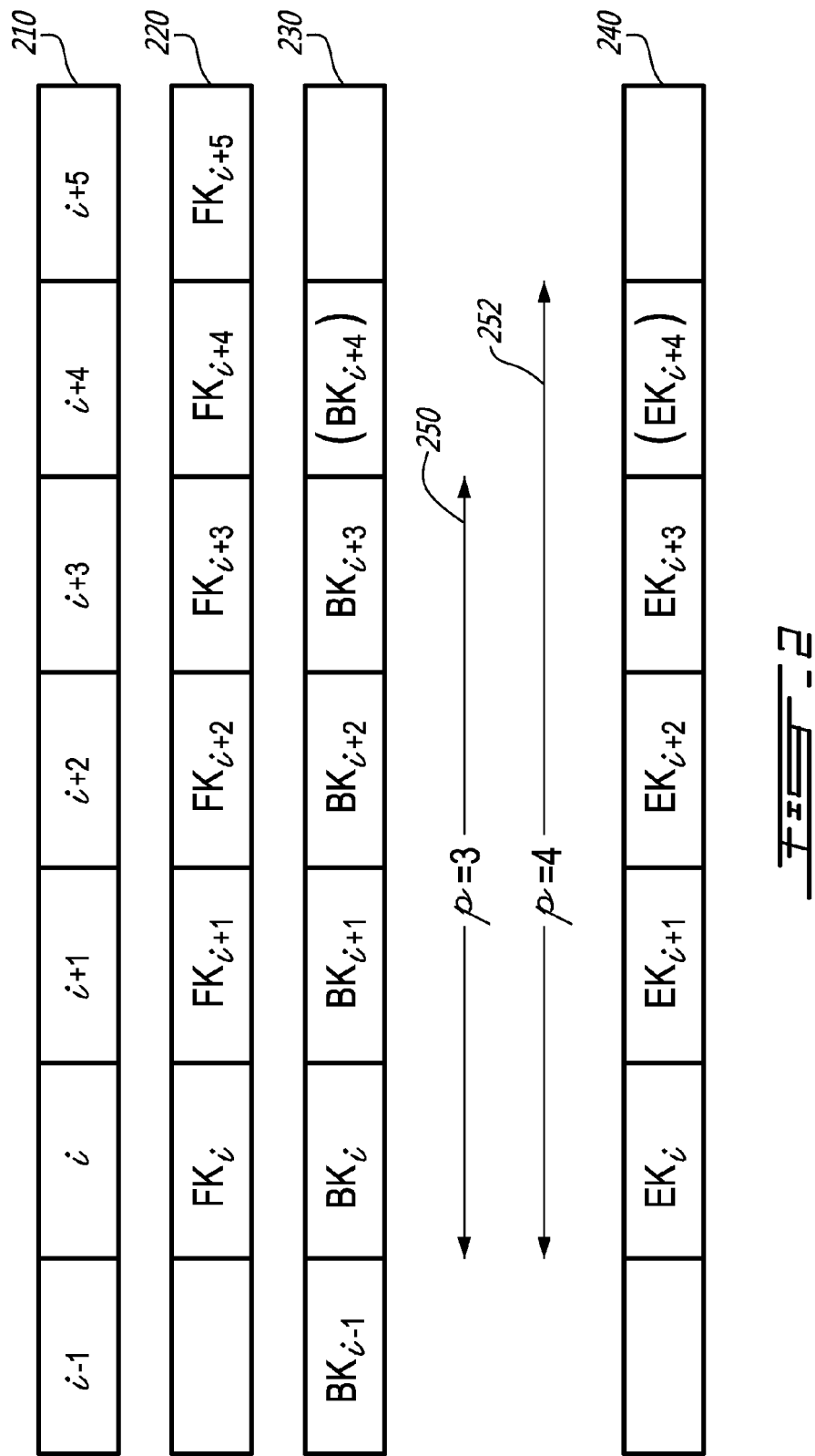
FIG. 2 shows an exemplary self-healing period of 3 or 4.

Reference is now made to the Drawings, in which FIG. 2 shows an exemplary self-healing period of 3 or 4, as introduced in co-pending U.S. application Ser. No. 12/533,734. Row 210 on FIG. 2 shows successive instants. The other rows show suites of keys corresponding to the instants of row 210. Row 220 shows forward key (FK) values in a FK chain, row 230 show backward key (BK) values in a BK chain, and row 240 show encryption key (EK) values. Two distinct self-healing values "p" are shown: A first self-healing value 250 is set equal to 3 instants and a second self-healing value 252 is set equal to 4. A server node or key server generates a suite of instants 210. At a given instant "i", the server node generates a forward key for that instant, $FK_i$. Whether or not they are calculated at the same time, next values in row 220 can be calculated by applying a one-way function, for example a one-way hashing, to $FK_i$. Hashing of $FK_i$ generates $FK_{i+1}$ and hashing of $FK_{i+1}$ generates $FK_{i+2}$, and so on, thereby building the FK chain. Within the same instant "i", the server node generates a backward key $BK_{i+p}$. If the self-healing period is 3, the generated backward key is $BK_{i+3}$. If the self-healing period is 4, the generated backward key is $BK_{i+4}$. Whether or not they are calculated at the same time, previous values in row 230 can be calculated by applying the same or another one-way function, for example a one-way hashing, to $BK_{i+p}$. Hashing of $BK_{i+4}$ generates $BK_{i+3}$ and hashing of $BK_{i+3}$ generates $BK_{i+2}$, and so on, thereby building the BK chain. Besides hashing, other one-way functions that may be used in the context of the present invention comprise, for example a multiplication and factoring function, a modular squaring and square roots function, a discrete exponential and logarithm function, NP-complete problems such as the subset sum or the traveling salesman problems, or any other function that is hard to invert (decode). In some embodiments, the server node may initially generate a complete BK chain, starting from a BK applicable at a last instant in a given session, for example for midnight in a given day or for the last few moments of a movie being delivered via satellite TV. Thereafter, the server node generates BK values for every instant preceding the last instant until a BK value for the beginning of the session is obtained. EK values of row 240 are calculated at every instant by use of the FK and the BK for the same instant. This calculation based on the FK and on the BK may consist of any type of mathematical operation, agreed upon between a server and its client, providing an EK value that is difficult to crack. In some embodiments, the FK and the BK are combined by use of an exclusive-OR operation in order to produce the EK (EK=FK XOR BK). The exemplary exclusive-OR operation is used throughout the disclosure in order to simplify the presentation of the invention and is not meant to exclude other types of operations. Until the next instant is reached, the EK value for an instant is used to encrypt at the source and to decrypt at the destination data packets exchanged between the server node and the client node.

FIG. 3 illustrates an exemplary method of acquiring encryption keys at a client node of a hierarchy of nodes. The sequence of events of FIG. 3, called a rekey process, occurs between the client node and a key server for a logical key hierarchy. At the start 300 of the sequence, the client node has subscribed to a LKH distribution network for receiving, for example, a streaming video content. The client node acquires, at a time r−1, a first encryption key ($EK_{r-1}$) and a first forward key ($FK_{r-1}$) at step 305. The "time r−1" and other such time designations of the present disclosure are not infinitesimal points in time, but rather designate validity time periods for related encryption keys. These time designations are not to be construed as having a fixed duration because a validity time period may vary depending on the needs of a system using LKH and the present invention. In the present disclosure, time events denoted with indicia such as "r" are positive integer numbers. The $EK_{r-1}$ may be obtained from the key server, through a previous iteration of the rekey process of FIG. 3. Alternatively, the $EK_{r-1}$ may be a time invariant key of the client node. It should be understood that, throughout the present disclosure, a "time invariant key" refers to a key of the client node that either does not change, or only changes on a much longer timescale than the rekey process of the present invention. Examples of time invariant keys may include a private key of the client node, wherein the server has obtained a corresponding public key of the client node, or may alternatively include shared key known to both the client node and the server. At 310, the server prepares a backward key applicable at a time r+p ($BK_{r+p}$). The value p is a self-healing period defined for the hierarchy of nodes. Because the time r is an integer number and relates to a given instant in a succession of instants, the value p is also a positive integer number. The self-healing period may be fixed or variable and may be unique for a plurality of clients served by the key server or may be a maximum amongst distinct self-healing periods for distinct client nodes. At 315, the server sends towards the client node a rekey message comprising the $BK_{r+p}$ encrypted with the $EK_{r-1}$. Alternatively, if the $EK_{r-1}$ is a private key of the client node, the server actually encrypts the $BK_{r+p}$ with a corresponding public key of the client node. As a further alternative, if the $EK_{r-1}$ is a shared secret key between the server and the client node, the server actually encrypts the $BK_{r+p}$ with the shared secret key. The client node receives the encrypted $BK_{r+p}$ in a rekey message at step 320. At 325, the client node decrypts the $BK_{r+p}$. The client node applies, at step 330 a first one-way function, for example a one-way hashing function, applying it p times to the $BK_{r+p}$ to obtain a backward key applicable at the time r ($BK_r$). The client node also applies, at step 335, a second one-way function to the $FK_{r-1}$ in order to obtain a forward key applicable at the time r ($FK_r$). In some embodiments, the first one-way function and the second one-way function may be one and the same function, for example a well-known hashing function, applied in the same manner both to forward keys and to backward keys. The client node combines at step 340 the $FK_r$ with the $BK_r$ to obtain a second encryption key applicable at the time r ($EK_r$). Of course, step 340 occurs while the "time r" is still an ongoing validity period for the $EK_r$ and its constituents. Combination of the $FK_r$ with the $BK_r$ may be done by use of the exemplary exclusive-OR operation. The client node is now capable of using the $EK_r$ to decode content received through the LKH distribution network. The $EK_r$ is usable for a validity period corresponding to the time r, that period ending when a next rekey message is sent from the server.

As show on FIG. 3, at step 345, the client node may apply the first one-way function p−1 times to the $BK_{r+p}$ to obtain a backward key applicable at the time r+1 ($BK_{r+1}$). Those skilled in the art will readily understand that step 345 may actually be executed as a part of step 330, meaning that the client node already obtained the $BK_{r+1}$ while completing the process of obtaining the $BK_r$. Alternatively, the client node may simply have recorded in memory the $BK_{r+p}$ for later use. At step 350, the client node may apply the second one-way function once to the $FK_r$ to obtain a forward key applicable at the time r+1 ($FK_{r+1}$). As in the case of the sequence of FIG. 2, in some embodiments, the first and second one-way functions may be the same one-way function, for example a same one-way hashing function. At step 355, the client node may combine the $FK_{r+1}$ and the $BK_{r+1}$ to obtain a third encryption key applicable at the time r+1 ($EK_{r+1}$).

The process ends at 360, and may restart at step 310 when the server steps the value of the time r, which is now equal to 1 plus the value of r that was used at the time of a previous iteration of the sequence of FIG. 3. If at that time the client node fails to receive the encrypted $BK_{r+p}$ at a next iteration of step 320, because of a transmission error, the client node may use the $EK_{r+1}$ previously calculated at step 355. In some embodiments, the client node may elect to only execute steps 345-355 if and when it misses a rekey message. It can be observed that the client node may miss up to p rekey messages and still be capable of calculating EK values for up to p validity periods, corresponding to the p missed rekey messages. Those skilled in the art will readily understand that once the client node has acquired the first forward key, it is capable at any time thereafter of calculating any next forward key value by use of the second one-way function.

In some embodiments, the self-healing period p may be dynamic and change with time. Client nodes may provide feedback to the key server, indicating that missing rekey messages is frequent, or not, and the key server may adjust the self-healing period accordingly. The key server may define a common, adjustable self-healing period p for all client nodes of the LKH distribution network. Alternatively, the key server may define distinct self-healing periods for distinct client nodes, for example based on feedback from each client node. In such a case, the key server may define a range of values of p, wherein a maximum value (max_p) corresponds to a longest self-healing period for all client nodes within the LKH distribution network. The key server sends a $BK_{r+max\_p}$ value to all client nodes; those client nodes for which the value of p is smaller may simply apply the first one-way function a few times to the received $BK_{r+max\_p}$ in order to obtain a $BK_{r+p}$ for their own, smaller value of p.

Figure 4:
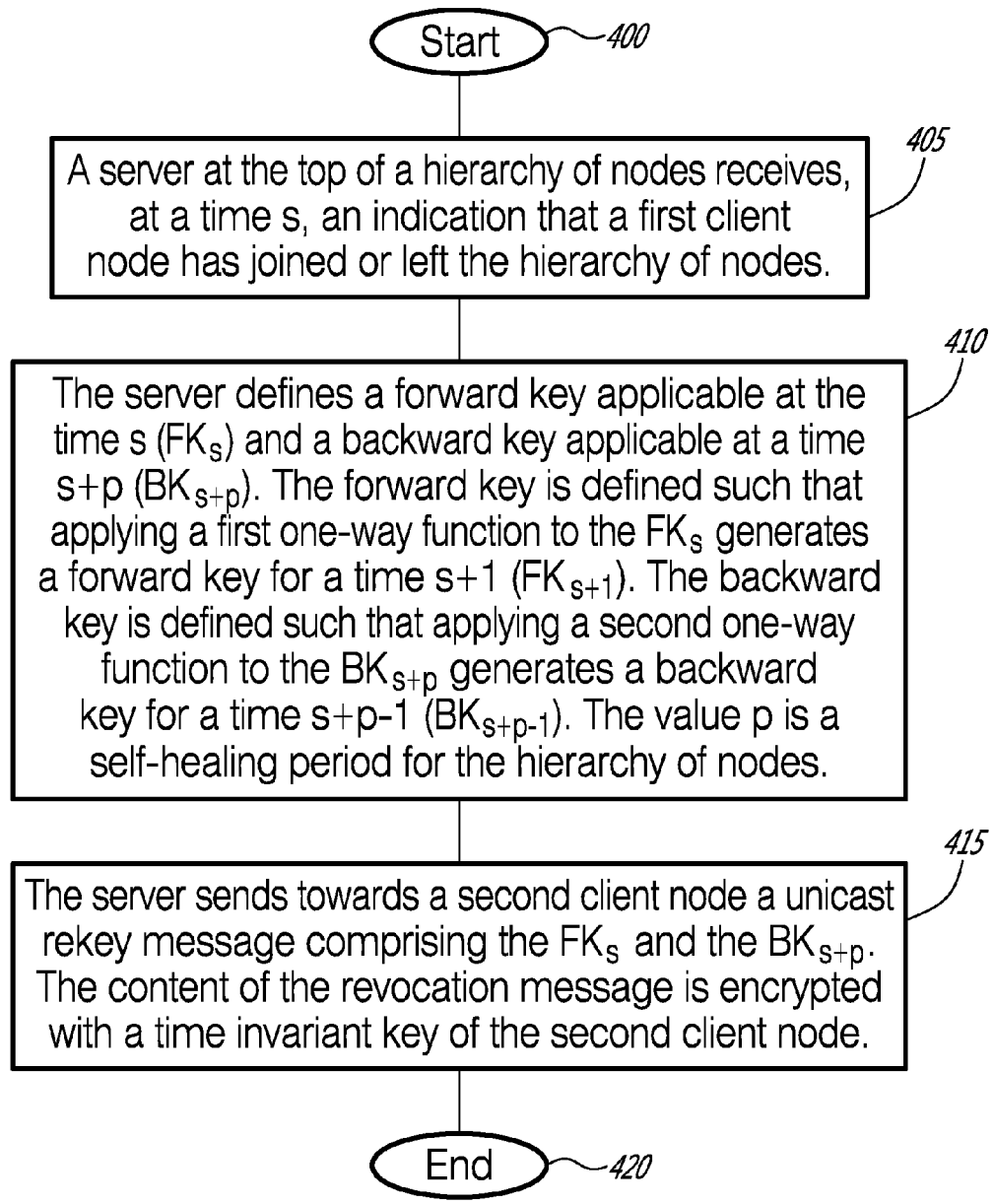
FIG. 4 illustrates an exemplary method of distributing encryption keys from a key server in a hierarchy of nodes.

FIG. 4 illustrates an exemplary method of distributing encryption keys from a key server in a hierarchy of nodes. The key server is located, at least logically, at the top of the hierarchy of nodes. At the start 400 of the sequence, the key server has distributed encryption keys to various client nodes. Each client node also has a time invariant key, known to the key server (or a time invariant private key, for which the server knows a corresponding time invariant public key). At step 405, the key server receives an indication that a first client node has joined or left the hierarchy of nodes. The step 405 occurs at a period of time referred to as "time s". The first client node has a sibling, which is a second client node connected towards the key server, in the hierarchy of nodes, through at least one common intermediate node called a parent node. Responsive to the indication received at step 405, the server defines at step 410, for the at least one parent common to the first and second client nodes, a parent forward key applicable at the time s (P-$FK_S$) and a parent backward key applicable at a time s+p (P-$BK_{s+p}$). The forward key is defined such that applying a first one-way function to the P-$FK_s$ generates a parent forward key for a time s+1 (P-$FK_{s+1}$). The parent backward key is defined such that applying a second one-way function to the P-$BK_{s+p}$ generates a parent backward key for a time s+p−1 (P-$BK_{s+p-1}$). In some embodiments, it may be desired to apply identical functions to both the forward keys and the backward keys. The value p is a self-healing period for the hierarchy of nodes; the period may be fixed or variable and it may be unique for all client nodes or may have distinct values for various client nodes. The server sends towards the second client node a unicast rekey message comprising the P-$FK_s$ and the P-$BK_{s+p}$ at step 415. The content of the unicast rekey message is encrypted with a time invariant key of the second client node. The sequence ends at step 420, when the second client node has acquired an encryption key applicable at the time s for the at least one parent node (P-$EK_s$), calculated based on the P-$FK_s$ and on a P-$BK_s$, which is itself obtained from the P-$BK_{s+p}$.

Figure 1B:
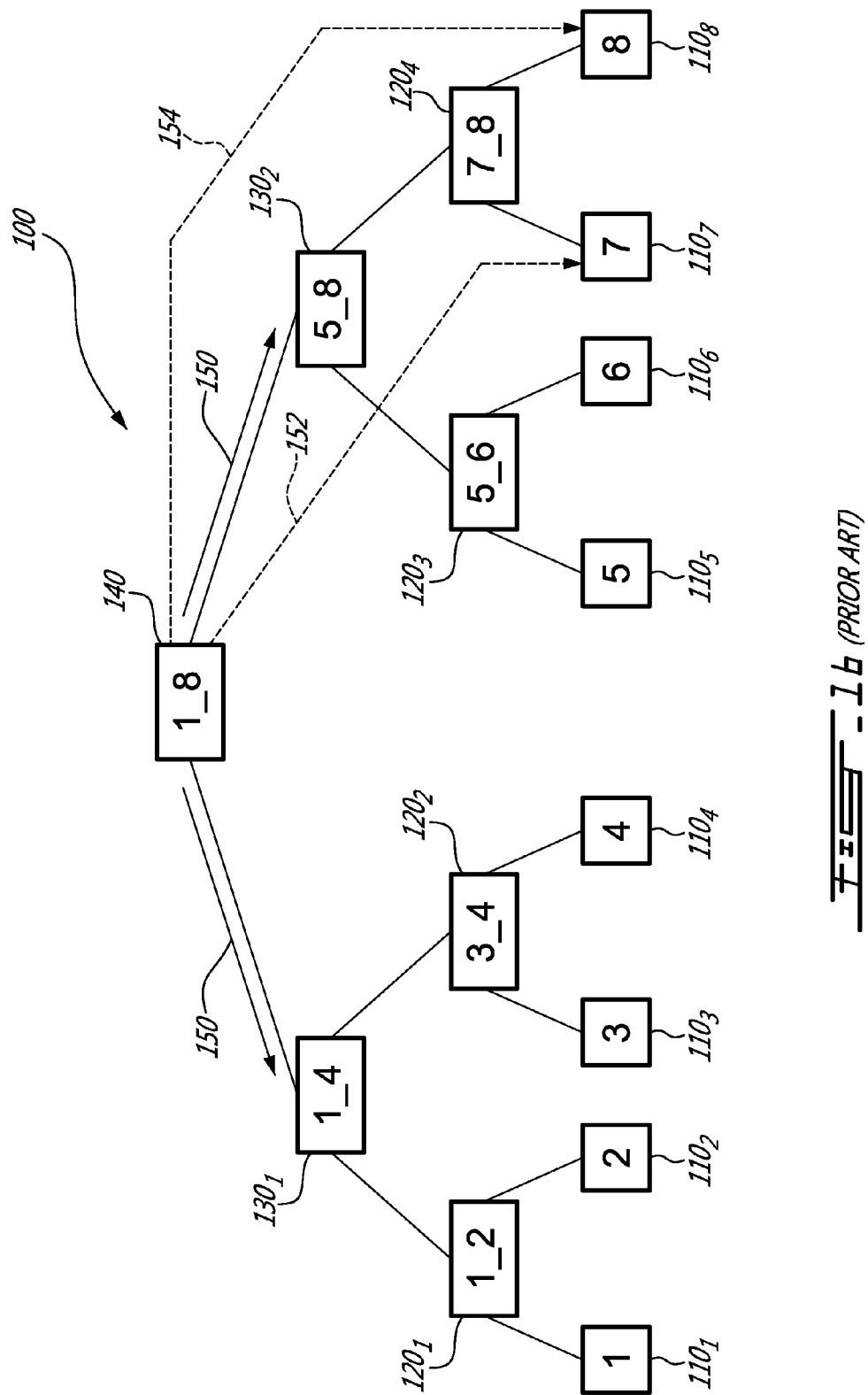
Figure 1C:
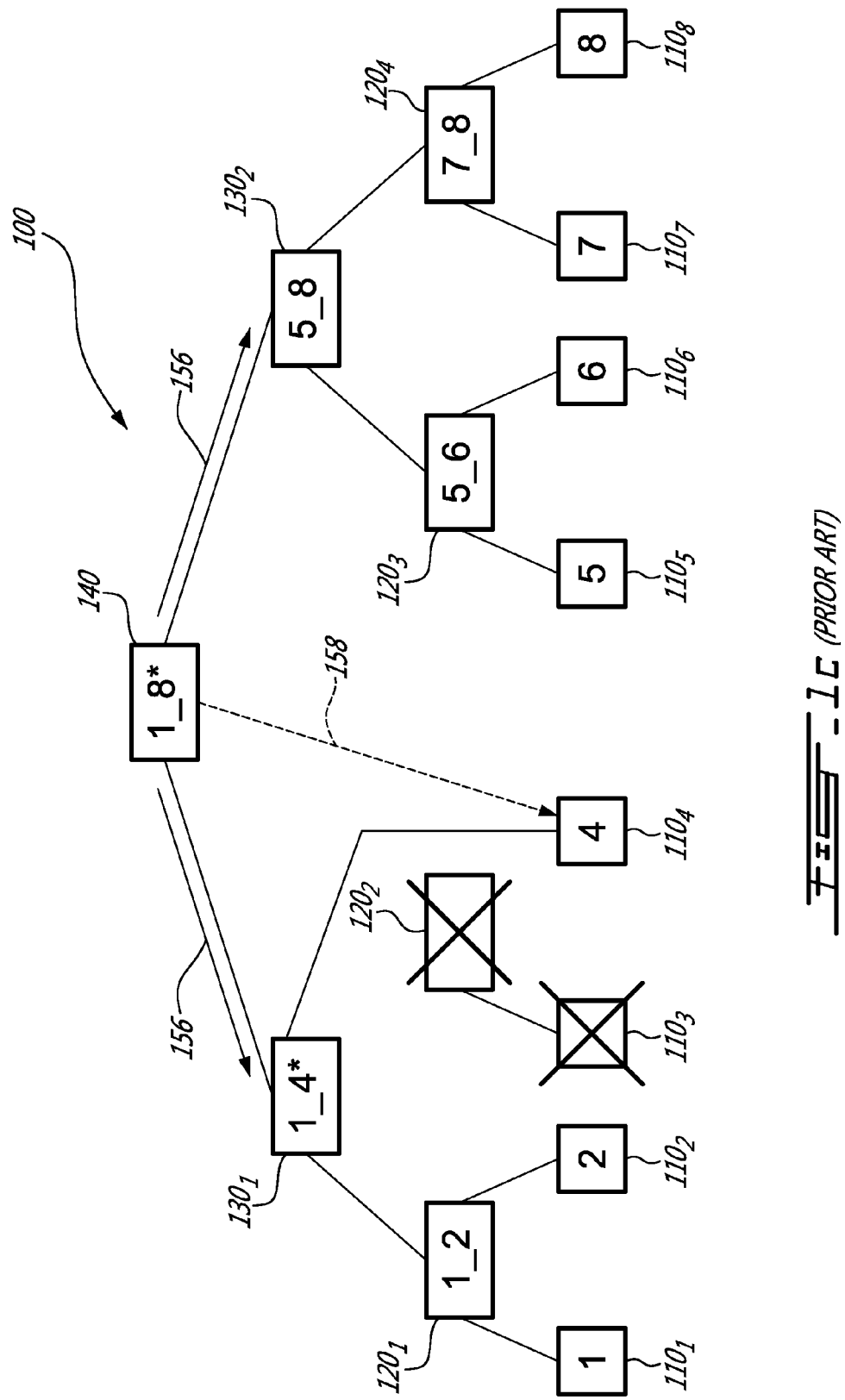
Figure 5A:
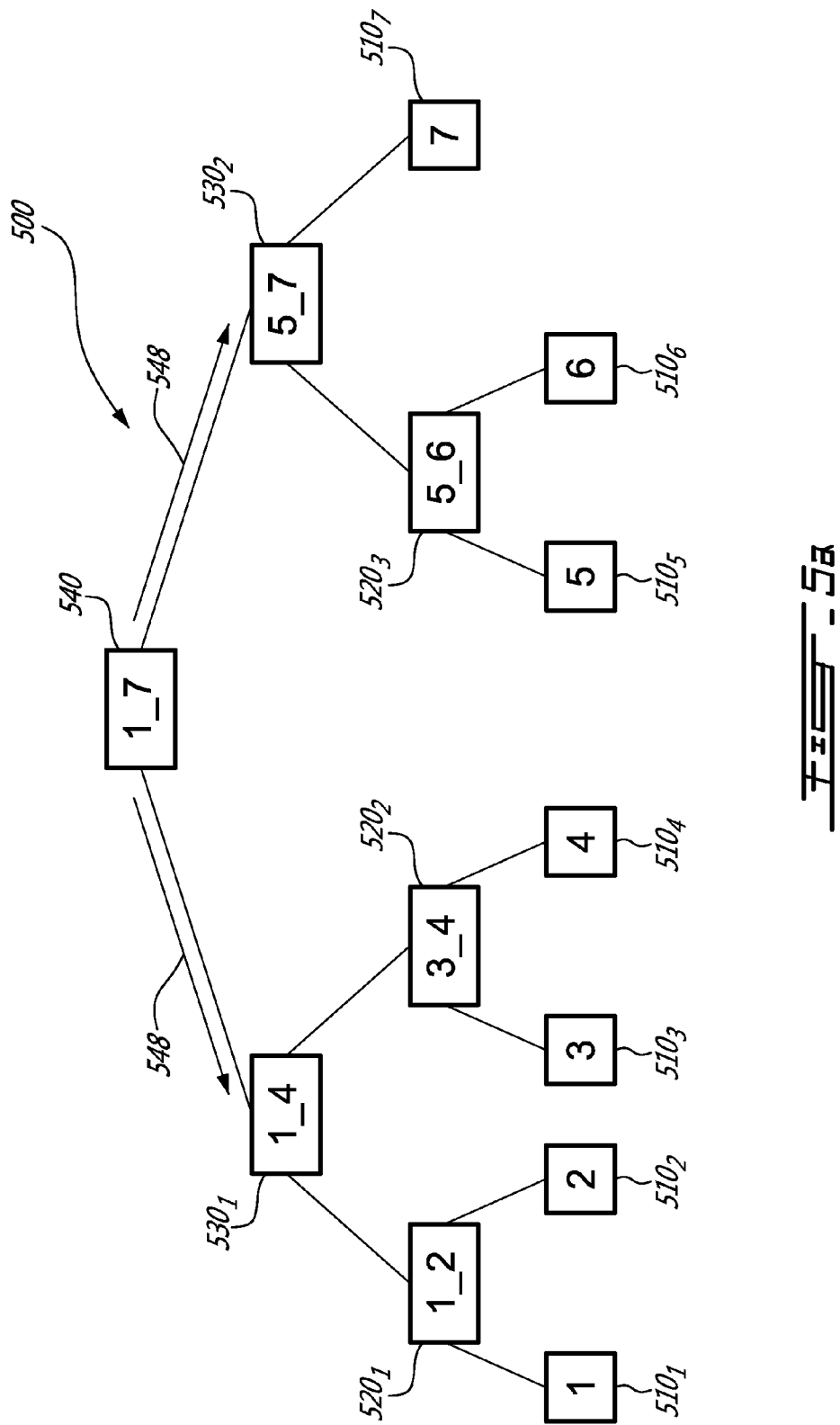
FIGS. 5a, 5b and 5c show a rekey process with self-healing for use in a complete logical key hierarchy distribution network.
Figure 5B:
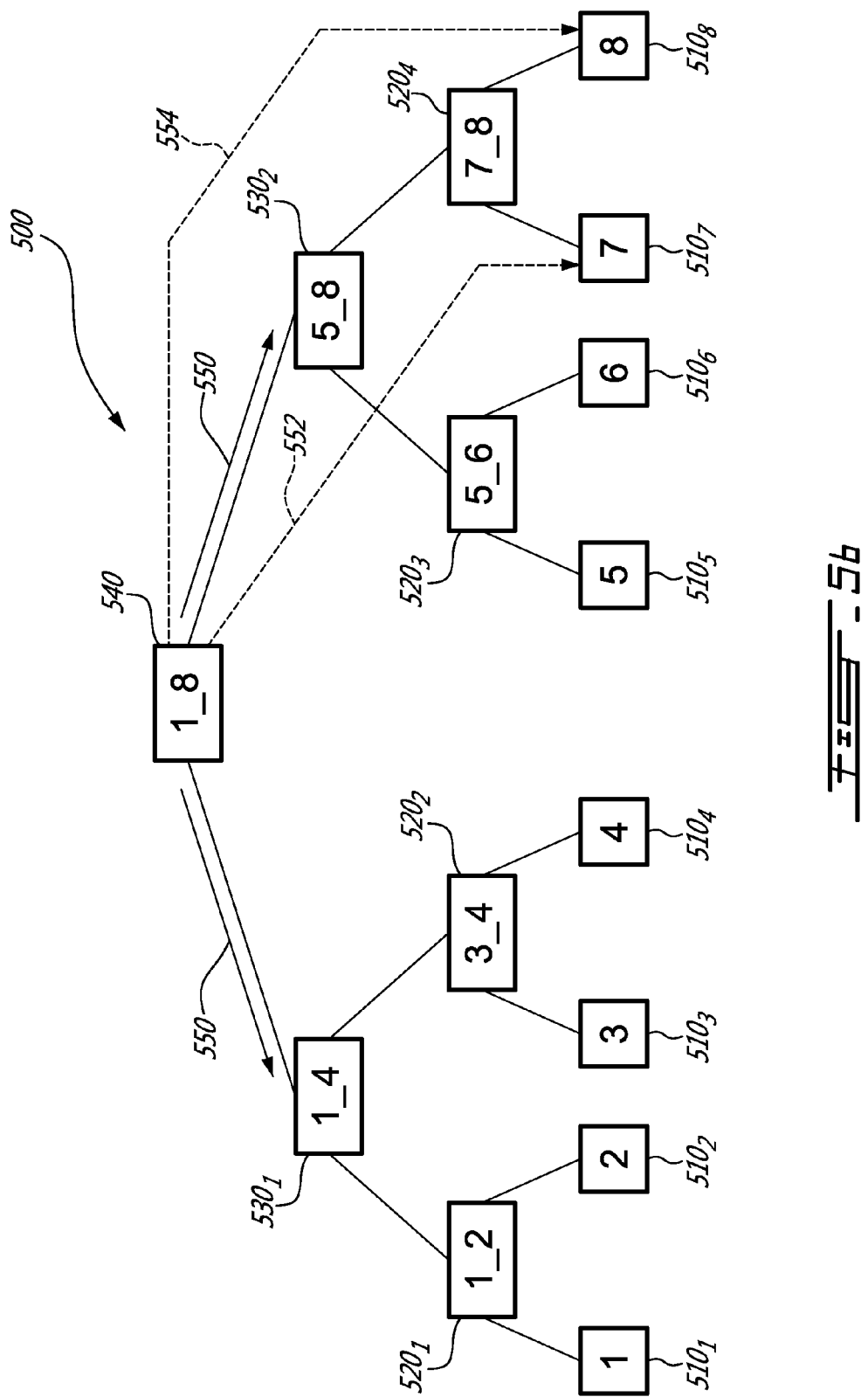
Figure 5C:
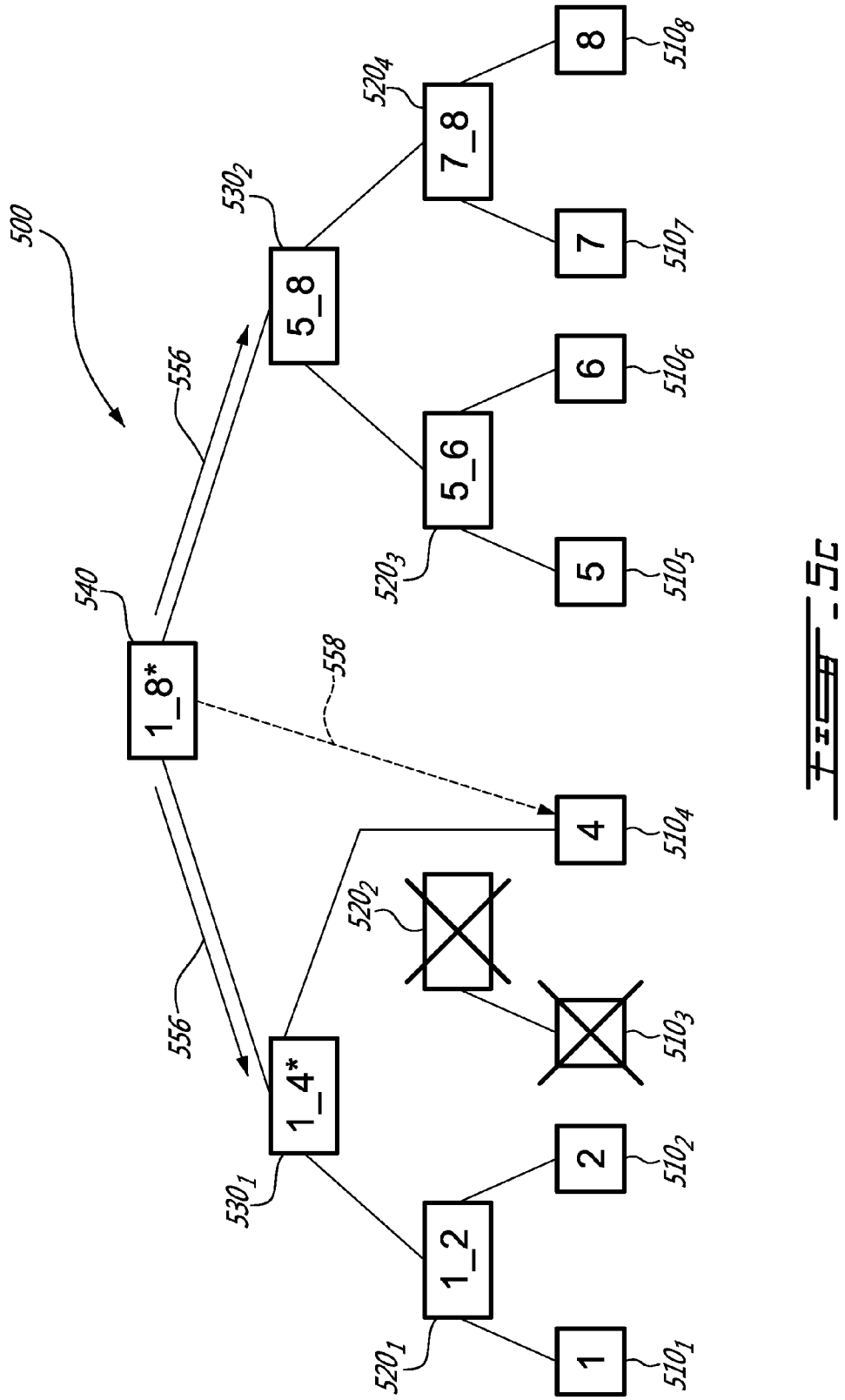

A rekey process with self-healing for use in a complete logical key hierarchy distribution network tree 500 is shown on FIGS. 5a, 5b and 5c, collectively referred to as FIG. 5. Even though elements of the tree 500 are shown as directly coupled in FIG. 5, the elements may be indirectly coupled and separated geographically. The simplified coupling is shown in order to more clearly illustrate communication paths. FIG. 5 shows how an embodiment of the present invention that, while preserving a self-healing property, handles rekey events that occur either periodically or upon other events impacting the tree 500. Some rekey events related to some client node leaving ($510_4$ in FIG. 5c) the LKH network may temporarily disable the self-healing property of the tree 500 in order to ensure forward and backward secrecy. FIG. 5 may appear similar to FIG. 1 and does generally use a similar notation, as both figures show distribution networks compliant with general LKH principles. However, contents of unicast and multicast rekey messages in the respective figures have noticeable differences. In FIG. 5, new keys are in most cases not randomly generated. Instead, at the time of a rekey event, new forward and backward keys are defined in a key server 540, wherein a combination of a forward key with a backward key provides a new key. To generate the new keys, as may be understood from the foregoing description of FIGS. 2 and 3, applying a one-way function (such as for example hashing) to a given backward key of a node applicable at a given instant yields a backward key of the same node for a previous instant. Likewise, applying the same or another one-way function once to a given forward key of a node yields a next forward key, applicable at a next instant, for the same node. The method illustrated in FIG. 5 therefore uses the concept of forward key chains and backward key chains, as introduced in the foregoing description of FIG. 2. Having received a backward key for a time r+p, a receiving node may apply the one-way function to generate all previous backward keys over the self-healing period p. Only updated backward keys are regularly sent in multicast rekey messages in the LKH tree 500 on FIG. 5 because related forward keys can be determined by the recipients of the messages by use of the proper one-way function as long as they have previously received, at least once, corresponding forward keys from the same forward key chains.

FIG. 5a shows an initial binary LKH tree 500. A binary tree is one in which a pair of nodes at a hierarchical level is supported by one parent node at one above level, each pair of parent nodes being supported by another, higher level parent node. It should be noted that the method of the present invention is not limited to binary trees and that the illustration of FIG. 5 is limited to the binary tree case solely for ease of explanation. Message sequences support a join event in FIG. 5b, and a leave event in FIG. 5c. In compliance with LKH architectures, parent nodes at a given hierarchical level have keys that are known by their subordinate nodes. For example, in FIG. 5a, higher layer node $530_2$ has a key known by client nodes $510_{5-7}$. Intermediate nodes $520_{1-4}$ and higher layer nodes $530_{1-2}$ may consist of physical nodes or may alternatively exist as logical nodes, for example as logical entities within the group key server 540. From the standpoint of the client node $510_1$, the intermediate node $520_1$, the higher layer node $530_1$ and the key server 540 are all its parent nodes. When user 8 ($510_8$) joins the tree 500 in FIG. 5b, the already existing client node $510_7$ and the new client node $510_8$ may become connected through a new parent, intermediate node $520_4$, because the exemplary hierarchy tree 500 is binary. The already existing client node $510_7$ and the new client node $510_8$ may be seen as sibling nodes because they share a connection towards the same intermediate node $520_4$. Arrival or departure of a client node may impact its sibling node because they share a parent node and thus share keys of that parent node. As in the case of FIG. 1, in some implementations, the intermediate node $520_4$ may have already been present in the initial hierarchy tree 500, though not shown in FIG. 5a, even though there is only one client node $510_7$ connected thereto. The following description of FIG. 5 assumes, for illustration purposes, that the intermediate node $520_4$ is absent from the initial LKH tree 500 of FIG. 5a. This illustration is not meant to limit the scope of the present invention. In FIG. 5b, the higher layer node $530_2$ is essentially unchanged by the addition of the client node $510_8$, except for the fact that it has a new key because it now supports one more client node that should not obtain any previous key of the higher layer node $530_2$.

In FIG. 5, a notation "x_y" within each node, other than the client nodes $510_1$ to $510_8$, designates a set of client nodes supported by a given parent node. For example, in FIG. 5a, the higher layer node $530_2$ is directly or indirectly a parent of the client nodes $510_{5-7}$. "5_7" thus is shown within the higher layer node $530_2$ of FIG. 5a. Turning to FIG. 5b, the client node $510_8$ is added underneath the higher layer node $530_2$, so "5_8" is shown within the higher layer node $530_2$ in order to reflect that this node is now, indirectly, a parent of the client nodes $510_{5-8}$. While in FIG. 5b the server node 540 shows "1_8" to reflect that it is a parent of client nodes $510_{1\_8}$, the server node 540 shows "1_8*" on FIG. 5c to simply reflect that it is a parent of a non-contiguous set of client nodes $510_{1\_2}$ and $510_{4\_8}$. A change of notation within any parent node of FIG. 5 does not indicate that the node is changed, but only illustrates a need for that node to have new keys.

FIG. 5a represents a stable situation where no client node is joining or leaving the LKH tree 500. At a time r−1, each of the client nodes $510_{1\_7}$ has obtained KEKs from the key server 540, for all their respective parents. For example, the client node $510_1$ has KEKs, applicable at the time r−1, for the intermediate node $520_1$ ($EK_{1\_2/r-1}$), for the higher layer node $530_1$ ($EK_{1\_4/r-1}$), and for the key server 540 ($EK_{1\_7/r-1}$). At time r, the key server 540 distributes new keys to all client nodes, in a multicast rekey message. However, given that a key is formed of a combination of a forward key with a corresponding backward key, the combination being made by use of the exemplary exclusive-OR operation, and given that the client nodes $510_{1\_7}$ all have earlier acquired the forward keys from the key server 540, the key server 540 may distribute, at the time r, a new backward key for the time r+p ($BK_{1\_7/r+p}$) without having to also distribute a corresponding forward key for the time r ($FK_{1\_7/r}$). The newly distributed backward key is encrypted with $EK_{1\_7/r-1}$, which can also be expressed as $FK_{1\_7/r-1}$ XOR $BK_{1\_7/r-}$. Of course, each subscribed client of the LKH tree 500 is capable of decoding the new backward key by use of that complete encryption key. The content of the multicast message at that time is thus "$FK_{1\_7/r-1}$ XOR $BK_{1\_7/r-1}(BK_{1\_7/r+p})$" denoting that the new backward key for the key server 540 at time r+p is encrypted by use of the complete encryption key for that server at the time r−1. In FIG. 5a, at the time r, the key server 540 additionally sends in multicast updated backward keys for all other parent nodes, including the intermediate nodes node $520_{1\_3}$ and the higher layer nodes $530_{1\_2}$. These backward keys are also sent for the time r+p and are encrypted with the corresponding encryption keys of the parent nodes for the time r−1, for example "$FK_{1\_4/r-1}$ XOR $BK_{1\_4/r-1}(BK_{1\_4/r+p})$" for the higher layer nodes $530_1$.

Turning to FIG. 5b, a new client $510_8$ joins the tree 500 at a time s, for example by getting a new subscription, and the group key server 540 is informed of that join event. If backward secrecy is a desired requirement, the new client $510_8$ should remain unable to decode any content it may have received before the time s. The group key server 540 defines a new $EK_{1\_8/s}$ for itself. The $EK_{1\_8/s}$ is still defined as a combination of a forward key with a backward key, i.e. $FK_{1\_8/s}$ XOR $BK_{1\_8/s}$, wherein "1_8" simply indicates that the group key server 540 now supports a range of client nodes $510_{1\_8}$. The $FK_{1\_8/s}$ is obtained by applying the appropriate one-way function once to a previous forward key of the key server 540 ($FK_{1\_7/s-1}$). The $BK_{1\_8/s}$ is part of a previously generated backward key chain and corresponds to the current time s, wherein applying the appropriate one-way function once to the $BK_{1\_8/s}$ would yield a backward key for a previous time s−1 ($BK_{1\_7/s-1}$). Considering at once FIGS. 5a and 5b, in exemplary cases where the time r (FIG. 5a) is the same as a time s−1 (FIG. 5b), meaning that the time s immediately comes after the time r, then $FK_{1\_7/s-1}$ is the same as $FK_{1\_7/r}$ and $BK_{1\_7/s-1}$ is the same as $BK_{1\_7/r}$. Regardless, the client nodes $510_{1\_7}$ already own the $FK_{1\_7/s}$ and can therefore generate the current forward key $FK_{1\_8/s}$ by applying the proper one-way function once. Receiving a rekey message carrying a backward key for a time s+p ($BK_{1\_8/s+p}$) at all client nodes enables preserving the self-healing period. However, if client nodes $510_{1\_7}$ have previously received at the time s−1 a backward key designated for that time plus the self-healing period ($BK_{1\_7/s-1+p}$), they can compute the $BK_{1\_8/s}$ and the $EK_{1\_8/s}$ even if they miss the rekey message carrying the $BK_{1\_8/s+p}$, as long as p is greater than or equal to 1.

Continuing the description of FIG. 5b, the group key server 540 sends, as a result of the join event, a multicast rekey message 550 to previously existing nodes of the tree 500. The multicast rekey message 550 carries sufficient information for the client nodes $510_{1\_7}$ that were already present in the tree 500 to obtain the complete $EK_{1\_8/s}$. Because the client nodes $510_{1\_7}$ already possess the $FK_{1\_7/s-1}$, they only need to receive the $BK_{1\_8/s+p}$. That backward key is encrypted by a previously known key of the group key server 540 for a previous time s−1 ($EK_{1\_7/s-1}$). Because all previously existing nodes on the right hand side of FIG. 5 need to acquire a new key for the higher layer node $530_2$, a new $EK_{5\_8/s}$ is also defined at the group key server 540. The backward key component of $EK_{5\_8/s}$, $BK_{5\_8/s+p}$, is sent in the multicast rekey message 550 to previously existing nodes of the tree 500, encrypted by a previously known KEK for the higher layer node $530_2$ ($EK_{5\_7}$). The content of the multicast rekey message 550 is thus expressed as "$FK_{1\_7/s-1}$ XOR $BK_{1\_7/s-1}(BK_{1\_8/s+p})$, $FK_{5\_7/s-1}$ XOR $BK_{5\_7/s-1}(BK_{5\_8/s+p})$". It may be noted that nodes on the left hand side of the tree 500 may receive but cannot decrypt the $BK_{58/s+p}$ component of the multicast rekey message 550. It may also be noted that, because the multicast rekey message 550 comprises more than one element, it may be split into a plurality of multicast rekey messages, the sum of which carry the complete content "$FK_{1\_7/s-1}$ XOR $BK_{1\_7/s-1}(BK_{1\_8/s+p})$, $FK_{5\_7/s-1}$ XOR $BK_{5\_7/s-1}(BK_{5\_8/s+p})$".

A new $EK_{7\_8/s}$ is generated at the group key server 540 for the new intermediate node $520_4$. This new key, or its constituents, needs to be provided to both sibling nodes $510_7$ and $510_8$. Both a corresponding forward key ($FK_{7\_8/s}$) and a corresponding, backward key defined for the time s+p ($BK_{7\_8/s+p}$) are sent in a unicast rekey message 552 to the client node $510_7$, encrypted with $K_7$, which is a shared key known by the client node $510_7$ and by the group key server 540 or a public key of the client node $510_7$ known to the group key server 540 and for which the client node $510_7$ has a corresponding private key. The content of the unicast rekey message 552 is thus "$K_7(FK_{7\_8/s}, BK_{7\_8/s+p})$".

Forward and backward components of $EK_{1\_8/s}$, $EK_{5\_8/s}$ and $EK_{7\_8/s}$ are also sent in a unicast rekey message 554 to the new node $510_8$, using $K_8$, which is a shared key known by the new node $510_8$ and by the group key server 540 or a public key of the client node $510_8$ known to the group key server 540 and for which the client node $510_8$ has a corresponding private key. The content of the unicast rekey message 554 is thus "$K_8(FK_{1\_8/s}, BK_{1\_8/s+p}, FK_{5\_8/s}, BK_{5\_8/s+p}, FK_{7\_8/s}, BK_{7\_8/s+p})$".

FIG. 5c depicts the departure of client node $510_3$. The departure event, occurring at a time q, does not necessarily mean that the client node $510_3$ has physically left the tree 500, but rather that he is now unsubscribed and is no longer allowed to receive any content from the tree 500. As a result of this departure, the hierarchy underneath the group key server 540 and the higher layer node $530_1$ has changed. The departure of the client node $510_3$ impacts its sibling, the client node $510_4$, because both siblings have been sharing a connection through the intermediate node $520_2$. The client node $510_4$ may now be directly connected to the higher layer node $530_1$. Of course, another option (not shown) may involve the intermediate node $520_2$ remaining in the tree 500, with $510_4$ remaining as the sole client node connected thereto. In any case, because the client node $510_3$ is in possession of several keys shared with its sibling, revocation of these keys takes place. For this, a new $EK_{1\_8*/q}$ and a new $EK_{1\_4*/q}$ are generated by the group key server 540.

The new keys $EK_{1\_8*/q}$ and $EK_{1\_4*/q}$ are not required to be randomly generated.

There are several manners of defining them while at the same time ensuring forward and backward secrecy within the LKH tree 500. In scenarios of FIG. 5c, one of the components of the new keys is defined in a manner that temporarily breaches self-healing within the tree 500. Three manners of breaching the self-healing characteristics of the tree 500 are described below.

In some embodiments, a modified component of the $EK_{1\_8*/q}$, denoted $EK^C_{1\_8*/q}$, is a new $FK_{1\_8*/q}$ being randomly generated to render it independent from any forward key previously used in the hierarchy of nodes while a backward key chain of the tree 500 is unmodified. In other embodiments, the $EK^C_{1\_8*/q}$ component is a new $BK_{1\_8*/q+p}$ being randomly generated to render it independent from any backward key previously used in the hierarchy of nodes while a forward key chain of the tree 500 is unmodified.

In yet other embodiments, while the forward key chain is unmodified, the $EK^C_{1\_8*/q}$ component is obtained from the previously used backward key chain, now being shifted by a period of p by adding the self-healing period p twice to the time q. A new $BK^{shift}_{1\_8*/q+2p}$ is thus selected. Adding the period p twice to the time q creates a break in the time sequence of the backward key chain. It may be observed that applying the appropriate one-way function p times (not 2p times) to the $BK^{shift}_{1\_8*/q+2p}$ arrives at a $BK_{1\_8*/q}$ value while applying the same one-way function 2p+1 times to the $BK^{shift}_{1\_8*/q+2p}$ arrives at a $BK_{1\_8*/q-1}$ value. Client nodes receiving the backward key also apply the appropriate one-way function p times to the $BK^{shift}_{1\_8*/q+2p}$ and deem the result a $BK_{1\_8*/q}$ value. Both the client nodes and the group key server 540 use the same value as the $BK_{1\_8*/q}$ value starting from the time q.

The same manner of generating the new $EK_{1\_8*/q}$ also applies for the new $EK_{1\_4*/q}$. Depending on the manner in which the $EK_{1\_8*/q}$ and $EK_{1\_4*/q}$ are generated, the $EK^C_{1\_8*/q}$ and $EK^C_{1\_4*/q}$ components of the multicast rekey message 500 are the new forward keys for the time q, or the new backward keys for the time q+p. Optionally, if strict security policies deny valid encryption information being held by a revoked user, both new forward and backward key chains may be generated randomly and the multicast rekey message 500 may carry both the new forward keys and the new backward keys. The new $EK^C_{1\_8*/q}$ and $EK^C_{1\_4*/q}$ are distributed to all remaining nodes of the tree 500 by use of a multicast rekey message 556, with the exception of the node $510_4$ that receives a unicast rekey message 558. The client node $510_4$ receives the new $EK^C_{1\_8*/q}$ and $EK^C_{1\_4*/q}$ directly in the unicast rekey message 558, encrypted with $K_4$, which is a shared key known by the client node $510_4$ and by the group key server 540. As persons skilled in the art will readily recognize, $K_4$ could also be a public key of the client node $510_4$ known to the group key server 540 and for which the client node $510_4$ has a corresponding private key. The content of the unicast rekey message 558 is thus expressed as "$K_4$ ($EK^C_{1\_8*/q}$, $EK^C_{1\_4*/q}$)". The content of the multicast rekey message 556 is "$FK_{5\_8*/q-1}$ XOR $BK_{5\_8/q-1}(EK^C_{1\_8*/q})$, $FK_{1\_2/q-1}$ XOR $BK_{1\_2/q-1}(EK^C_{1\_4*/q}, EK^C_{1\_8*/q})$". In some embodiments, this content may be split in a plurality of multicast rekey messages. It should be noted that none of the messages of FIG. 5c is decryptable by the departed node $510_3$, though that node might still be sniffing packets transmitted in the tree 500, because all rekey messages are encrypted by keys unknown to node $510_3$.

An exemplary construction of a client node will now be described by reference to FIG. 6, which shows an exemplary client node 600 according to an aspect of the present invention. The client node 600 comprises a memory 610, a controller 620 and an interface 630. The memory 610, which stores encryption keys, may be a volatile memory, or may alternatively be a non-volatile memory, or persistent memory, that can be electrically erased and reprogrammed and that may be implemented, for example, as a flash memory or as a data storage module. The memory 610 could further represent a plurality of memory modules comprising volatile and/or non-volatile modules. The controller 620 may be any commercially available, general purpose processor, or may be specifically designed for operation in the client node 600. The controller 620 may be operable to execute processes related to the present invention in addition to numerous other processes. The controller 720 may also be a logical view of an array of processors and/or controllers. The interface 630 communicates with other nodes of a logical hierarchy of nodes. It may be implemented as one single device or as distinct devices for receiving and sending signaling, messages and data. The client node 600 may comprise, in various embodiments, various types of devices such as, for example, a satellite TV decoder, a cable TV decoder, a personal computer, a gaming device, and the like. Therefore the interface 630 may comprise a plurality of devices for connecting on links of different types. Only one generic interface 630 is illustrated for ease of presentation of the present invention.

In operation, the client node 600 is located, at least from a logical standpoint, at a lowest level of the logical hierarchy of nodes. The client node 600 acquires encryption keys for use in decoding a received content. When it first connects to the hierarchy of nodes, at a time v, the controller 620 receives, through the interface 630, from a key server of the logical hierarchy of nodes, a first forward key for the time v (FKO and a first backward key for a time v+p ($BK_{v+p}$), wherein the value p is a self-healing period for the hierarchy of nodes. The $FK_v$ and the $BK_{v+p}$ have been encrypted at the key server with a time-invariant key of the client node 600 that is shared between the client node 600 and the key server. The controller 620 reads the time-invariant key from the memory 610 and decrypts the $FK_v$ and the $BK_{v+p}$. The controller 610 stores the $FK_v$ and the $BK_{v+p}$ in the memory 610. The controller 610 then applies a first one-way function p times to the $BK_{v+p}$, thereby obtaining a backward key applicable at the time ($BK_v$). The controller 610 then combines the $FK_v$ and the $BK_v$, for example by use of an exclusive-OR function, to obtain a new encryption key applicable at the time v ($EK_v$). The controller 620 then stores the $EK_v$ in the memory 610. Until a next time step occurs at time v+1, the client node 600 may use the $EK_v$ to decode any content received at the interface 630. At the next instant v+1, the controller 620 receives through the interface 630, from the key server, a backward key applicable at a time v+1+p ($BK_{v+1+p}$). The received $BK_{v+1+p}$ has been encrypted with the $EK_v$. The controller 620 reads the $EK_v$ from the memory 610 and uses the $EK_v$ for decrypting the $BK_{v+1+p}$. The controller 620 stores the $BK_{v+1+p}$ in the memory 610. The controller 610 then applies the first one-way function p times to the $BK_{v+1+p}$, thereby obtaining a backward key applicable at the time v+1 ($BK_{v+1}$). The controller 610 also applies the same or another one-way function once to the $FK_v$ in order to obtain a forward key for the time v+1 ($FK_{v+1}$). The controller 610 then combines the $FK_{v+1}$ and the $BK_{v+1}$, by use of the exemplary exclusive-OR function, to obtain a new encryption key applicable at the time v+1 ($EK_{v+1}$). The controller 620 then stores the $EK_{v+1}$ in the memory 610. The client node 600 may now use the $EK_{v+1}$ to decode any content received at the interface 630.

At a time v+2, the client node 600 may fail to receive a new backward key for a time v+2+p ($BK_{v+2+p}$). When this happens, the controller 620 reads the $BK_{v+1+p}$ from the memory 610. The controller 620 may apply the first one-way function p−1 times to the $BK_{v+1+p}$ in order to obtain a backward key for the time v+2 ($BK_{v+2}$). The controller 620 in addition applies the appropriate one-way function once to the $FK_{v+1}$ in order to obtain a forward key for the time v+2 ($FK_{v+2}$). The controller 620 then combines the $FK_{v+2}$ and the $BK_{v+2}$ to obtain a new encryption key applicable at the time v+2 ($EK_{v+2}$) and stores it in the memory 610. The client node 600 may miss receiving up to p rekey messages from the key server while remaining capable of calculating encryption keys (EK) for those p events. If the client node 600 misses receiving more than p rekey events, the controller 620 may request the interface 630 to send towards the key server a message requesting invocation of a key recovery mechanism. In addition, the client node 600 is capable of performing the features of the various embodiments of the client nodes of FIGS. 2-5.

An exemplary construction of a key server node for use in a logical key hierarchy will now be described by reference to FIG. 7, which shows an exemplary key server node 700 according to an aspect of the present invention. The key server node 700 comprises a memory 710, a processor 720, a controller 730 and an interface 740. The memory 710, which stores encryption keys, may be a volatile memory, or may alternatively be a non-volatile memory, or persistent memory, that can be electrically erased and reprogrammed and that may be implemented, for example, as a flash memory or as a data storage module. The memory 710 could further represent a plurality of memory modules comprising volatile and/or non-volatile modules. The processor 720 as well as the controller 730 may be any commercially available, general purpose processor, or may be specifically designed for operation in the key server node 700. One or both of the processor 720 and the controller 730 may also be logical views of arrays of processors and/or controllers. These two elements 720 and 730 are shown as distinct components of FIG. 7 in order to better highlight their respective features. However, those skilled in the art will readily recognize that the processor 720 and the controller 730 may be combined in a generic processing element or an appropriately designed or programmed processing element, capable of performing features of both the processor 720 and the controller 730. The processor 720 and the controller 730 may both be operable to execute processes related to the present invention in addition to numerous other processes. The processor 720 and the memory 710 may further embody some or all of the logical nodes of the logical hierarchy. The interface 740 communicates with other nodes of the logical hierarchy. It may be implemented as one single device or as distinct devices for receiving and sending signaling, messages and data. The key server node 700 may comprise, in various embodiments, various types of devices such as, for example, a satellite TV transmitter, a cable TV transmitter, a specially programmed internet protocol server, and the like. The key server node 700 may communicate with client nodes either directly or through physical intermediate nodes. Therefore the interface 740 may comprise a plurality of devices for connecting on links of different types. Only one generic interface 740 is illustrated for ease of presentation of the present invention.

In operation, the key server node 700 is located, at least from a logical standpoint, at the top of the logical hierarchy. An important feature of the key server node 700 relates to the distribution of encryption keys. In the key server node 700, the controller 730 generally controls the operations of all components in the key server 700. The processor 720 generates forward key (FK) chains and backward key (BK) chains that the controller 730 stores in the memory 710. The interface 740 communicates with client nodes of the logical hierarchy. The controller 730 receives through the interface 740, at a time s, an indication that a first client node has joined or left the hierarchy. Responsive to the indication, the controller 730 instructs the processor 720 to define a forward key applicable at the time s ($FK_s$) and a backward key applicable at a time s+p ($BK_{s+p}$). The forward key is defined such that applying a first one-way function to the $FK_s$ generates a forward key for a time s+1 ($FK_{s+1}$). The backward key is defined such that applying a second one-way function to the $BK_{s+p}$, generates a backward key for a time s+p−1 ($BK_{s+p-1}$). The value p is a self-healing period for the hierarchy and, as explained hereinabove, may be dynamic and may constitute a maximum of a range of self-healing periods for the hierarchy. The controller 730 stores the $FK_s$ and the $BK_{s+p}$ in the memory 710. The controller 730 also reads from the memory 710 a time invariant key of a second client node. The controller 730 then instructs the interface 740 to send towards the second client node a unicast rekey message comprising the $FK_s$ and the $BK_{s+p}$, the unicast rekey message being encrypted with the time invariant key of the second client node. In addition, the key server node 700 is capable of performing the features of the various embodiments of the key server nodes of FIGS. 2-5.

Although several aspects of the preferred embodiment of the method, of the client node and of the server node of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of acquiring encryption keys in a hierarchy of nodes, the method comprising the steps of:

acquiring at a client node, at a time r−1, a first encryption key ($EK_{r-1}$) and a first forward key ($FK_{r-1}$); receiving at the client node, from a key server, at a time r, a backward key applicable at a time r+p($BK_{r+p}$), the $BK_{r+p}$ being encrypted with the $EK_{r-1}$, p being a period defined for the hierarchy of nodes;

applying at the client node a first one-way function p times to the $BK_{r+p}$ to obtain a backward key applicable at the time r($BK_r$);

applying at the client node a second one-way function to the $FK_{r-1}$ to obtain a backward key applicable at the time r($FK_r$);

combining at the client node the $FK_r$ with the $BK_r$ to obtain a second encryption key applicable at the time r($EK_r$); and receiving at the client node, at a time q which is later in time than the time r, a unicast rekey message comprising, for a parent node connecting the client node, a first parent forward key applicable at the time q, (P1-$FK_q$) and a first parent backward key applicable at a time q+p (P1-$BK_{q+p}$), the P1-$FK_q$ and the P1-$BK_{q+p}$ being encrypted with a time invariant key of the client node.

2. The method of claim 1, further comprising the steps of:

applying the first one-way function p−1 times to the $BK_{r+p}$ to obtain a backward key applicable at the time r+1 ($BK_{r+1}$);

applying the second one-way function to the $FK_r$ to obtain a forward key applicable at the time $r+1$ ($FK_{r+1}$); and combining the $FK_{r+1}$ and the $BK_{r+1}$ to obtain a third encryption key applicable at the time $r+1$ ($EK_{r+1}$).

3. The method of claim 2, wherein the unicast rekey message is received at the client node when a sibling node, at a same hierarchical level as the client node, joins the hierarchy of nodes at the time q.

4. The method of claim 3, further comprising the step of:
receiving at the client node a multicast rekey message comprising, for each other parent node of the client node, a second parent backward key applicable at a time $q+p$ ($P2\text{-}BK_{q+p}$) encrypted with an encryption key of that second parent node applicable at a time $q-1$ ($P2\text{-}EK_{q-1}$).

5. The method of claim 1, wherein the unicast rekey message is received at the client node when a sibling node, at a same hierarchical level as the client node, joins the hierarchy of nodes at the time q.

6. The method of claim 5, further comprising the step of:
receiving at the client node a multicast rekey message comprising, for each other parent node of the client node, a second parent backward key applicable at a time $q+p$ ($P2\text{-}BK_{q+p}$) encrypted with an encryption key of that second parent node applicable at a time $q-1$ ($P2\text{-}EK_{q-1}$).

7. The method of claim 1, further comprising the step of:
receiving at the client node, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$.

8. The method of claim 1, further comprising the step of:
receiving at the client node, at a time s which is later in time than the time r, a unicast rekey message encrypted with a time invariant key of the client node, the unicast rekey message comprising a backward key applicable at a time $s+p$ ($BK_{s+p}$), wherein the $BK_r$ cannot be calculated based on the $BK_{s+p}$.

9. The method of claim 1, further comprising the step of:
receiving at the client node, at a time t which is later in time than the time r, a unicast rekey message encrypted with a time invariant key of the client node, the unicast rekey message comprising a backward key applicable at a time $t+p$ ($BK_{t+p}$);
wherein applying the first one-way function p times to the $BK_{t+p}$ arrives at a backward key applicable at the time t ($BK_t$) and wherein applying the first one-way function $2p+1$ times to the $BK_{t+p}$ arrives as a backward key applicable at a time $t-1$ ($BK_{t-1}$).

10. A method of acquiring encryption keys in a hierarchy of nodes, the method comprising the steps of:
acquiring at a client node, at a time $r-1$, a first encryption key ($EK_{r-1}$) and a first forward key ($FK_{r-1}$);
receiving at the client node, from a key server, at a time r, a backward key applicable at a time $r+p$ ($BK_{r+p}$), the $BK_{r+p}$ being encrypted with the $EK_{r+1}$, p being a period defined for the hierarchy of nodes; applying at the client node a first one-way function p times to the $BK_{r+p}$ to obtain a backward key applicable at the time $r$($BK_r$);
applying at the client node a second one-way function to the $FK_{r-1}$ to obtain a backward key applicable at the time $r$($FK_r$); combining at the client node the $FK_r$ with the $BK_r$ to obtain a second encryption key applicable at the time $r$($EK_r$); and
receiving at the client node, at a time q which is later in time than the time r, a unicast rekey message comprising, for each parent node connecting the client node in the hierarchy of nodes, a parent backward key applicable at a time $q+p$ ($P\text{-}BK_{q+p}$), each $P\text{-}BK_{q+p}$ being encrypted with a time invariant key of the client node.

11. The method of claim 10, further comprising the steps of:
applying the first one-way function $p-1$ times to the $BK_{r+p}$ to obtain a backward key applicable at the time $r+1$ ($BK_{r+1}$);
applying the second one-way function to the FKr to obtain a forward key applicable at the time r+1(FKr+1); and
combining the FKr+1 and the BKr+1 to obtain a third encryption key applicable at the time r+1(EKr+1).

12. The method of claim 11, wherein the unicast rekey message is received at the client node when a sibling node, connected to the hierarchy of nodes through a same parent node as the client node, leaves the hierarchy of nodes at the time q.

13. The method of claim 10, wherein the unicast rekey message is received at the client node when a sibling node, connected to the hierarchy of nodes through a same parent node as the client node, leaves the hierarchy of nodes at the time q.

14. The method of claim 10 further comprising the step of:
receiving at the client node, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$.

15. The method of claim 10, further comprising the step of:
receiving at the client node, at a time s which is later in time than the time r, a unicast rekey message encrypted with a time invariant key of the client node, the unicast rekey message comprising a backward key applicable at a time $s+p$ ($BK_{s+p}$), wherein the $BK_r$ cannot be calculated based on the $BK_{s+p}$.

16. The method of claim 10, further comprising the step of:
receiving at the client node, at a time t which is later in time than the time r, a unicast rekey message encrypted with a time invariant key of the client node, the unicast rekey message comprising a backward key applicable at a time $t+p$ ($BK_{t+p}$);
wherein applying the first one-way function p times to the $BK_{t+p}$ arrives at a backward key applicable at the time t($BK_t$) and wherein applying the first one-way function $2p+1$ times to the $BK_{t+p}$ arrives as a backward key applicable at a time $t-1$($BK_{t-1}$).

17. A method of acquiring encryption keys in a hierarchy of nodes, the method comprising the steps of:
acquiring at a client node, at a time $r-1$, a first encryption key ($EK_{r-1}$) and a first forward key ($FK_{r-1}$);
receiving at the client node, from a key server, at a time r, a backward key applicable at a time $r+p$ ($BK_{r+p}$), the $BK_{r+p}$ being encrypted with the $EK_{r-1}$, p being a period defined for the hierarchy of nodes; applying at the client node a first one-way function p times to the $BK_{r+p}$ to obtain a backward key applicable at the time $r$ ($BK_r$);
applying at the client node a second one-way function to the $FK_{r-1}$ to obtain a backward key applicable at the time $r$ ($FK_r$);
combining at the client node the $FK_r$ with the $BK_r$ to obtain a second encryption key applicable at the time $r$ ($EK_r$); and
receiving at the client node, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$.

18. The method of claim 17, further comprising the steps of:
applying the first one-way function p−1 times to the $BK_{r+p}$ to obtain a backward key applicable at the time r+1 ($BK_{r+1}$);
applying the second one-way function to the $FK_r$ to obtain a forward key applicable at the time r+1($FK_{r+1}$); and
combining the $FK_{r+1}$ and the $BK_{r+1}$ to obtain a third encryption key applicable at the time r+1($EK_{r+1}$).

19. The method of claim 17, further comprising the step of:
receiving at the client node, at a time s which is later in time than the time r, a unicast rekey message encrypted with a time invariant key of the client node, the unicast rekey message comprising a backward key applicable at a time s+p ($BK_{s+p}$), wherein the $BK_r$ cannot be calculated based on the $BK_{s+p}$.

20. The method of claim 17, further comprising the step of:
receiving at the client node, at a time t which is later in time than the time r, a unicast rekey message encrypted with a time invariant key of the client node, the unicast rekey message comprising a backward key applicable at a time t+p ($BK_{t+p}$);
wherein applying the first one-way function p times to the $BK_{t+p}$ arrives at a backward key applicable at the time t ($BK_t$) and wherein applying the first one-way function 2p+1 times to the $BK_{t+p}$ arrives as a backward key applicable at a time t−1($BK_{t-1}$).

21. A method of acquiring encryption keys in a hierarchy of nodes, the method comprising the steps of:
acquiring at a client node, at a time r−1, a first encryption key ($EK_{r-1}$) and a first forward key($FK_{r-1}$);
receiving at the client node, from a key server, at a time r, a backward key applicable at a time r+p ($BK_{r+p}$), the $BK_{r+p}$ being encrypted with the $EK_{r-1}$, p being a period defined for the hierarchy of nodes; applying at the client node a first one-way function p times to the $BK_{r+p}$ to obtain a backward key applicable at the time r ($BK_r$);
applying at the client node a second one-way function to the $FK_{r-1}$ to obtain a backward key applicable at the time r ($FK_r$); combining at the client node the $FK_r$ with the $BK_r$ to obtain a second encryption key applicable at the time r ($EK_r$); and
receiving at the client node, at a time s which is later in time than the time r, a unicast rekey message encrypted with a time invariant key of the client node, the unicast rekey message comprising a backward key applicable at a time s+p (BKs+p), wherein the BKr cannot be calculated based on the BKs+p.

22. The method of claim 21, further comprising the steps of:
applying the first one-way function p−1 times to the $BK_{r+p}$ to obtain a backward key applicable at the time r+1 ($BK_{r+1}$); and
applying the second one-way function to the FKr to obtain a forward key applicable at the time r+1(FKr+1); and
combining the FKr+1 and the BKr+1 to obtain a third encryption key applicable at the time r+1(EKr+1).

23. The method of claim 21, wherein applying the first one-way function p times to the $BK_{s+p}$ arrives at a backward key applicable at the time s($BK_s$) and wherein applying the first one-way function 2p+1 times to the $BK_{s+p}$ arrives as a backward key applicable at a time s−1 ($BK_{s-1}$).

24. A method of acquiring encryption keys in a hierarchy of nodes, the method comprising the steps of:
acquiring at a client node, at a time r−1, a first encryption key ($EK_{r-1}$) and a first forward key ($FK_{r-1}$);
receiving at the client node, from a key server, at a time r, a backward key applicable at a time r+p ($BK_{r+p}$), the $BK_{r+p}$ being encrypted with the $EK_{r-1}$, p being a period defined for the hierarchy of nodes; applying at the client node a first one-way function p times to the $BK_{r+p}$ to obtain a backward key applicable at the time r ($BK_r$);
applying at the client node a second one-way function to the $FK_{r-1}$ to obtain a backward key applicable at the time r ($FK_r$); and
combining at the client node the $FK_r$ with the $BK_r$ to obtain a second encryption key applicable at the time r ($EK_r$).

25. The method of claim 24, further comprising the steps of:
applying the first one-way function p−1 times to the $BK_{r+p}$ to obtain a backward key applicable at the time r+1 ($BK_{r+1}$);
applying the second one-way function to the $FK_r$ to obtain a forward key applicable at the time r+1($FK_{r+1}$); and
combining the $FK_{r+1}$ and the $BK_{r+1}$ to obtain a third encryption key applicable at the time r+1($EK_{r+1}$).

26. A client node in a hierarchy of nodes for acquiring encryption keys, comprising:
a memory configured to store encryption keys; an interface configured to communicate with other nodes of the hierarchy of nodes; and
a controller to control the memory and the interface and further configured to:
acquire, at a time r−1, a first encryption key ($EK_{r-1}$) and a first forward key ($FK_{r-1}$);
receive, from a key server, at a time r, a backward key applicable at a time r+p ($BK_{r+p}$), the $BK_{r+p}$ being encrypted with the $EK_{r-1}$, p being a period for the hierarchy of nodes; apply a first one-way function p times to the $BK_{r+p}$ to obtain a backward key applicable at the time r ($BK_r$);
apply a second one-way function to the $FK_{r-1}$ to obtain a backward key applicable at the time r ($FK_r$); and
combine the $FK_r$ with the $BK_r$ to obtain a second encryption key applicable at the time r ($EK_r$r);
wherein the controller is further configured to:
receive, at a time q which is later in time than the time r, a unicast rekey message comprising, for a parent node connecting the client node, a first parent forward key applicable at the time q, (P1-$FK_q$) and a first parent backward key applicable at a time q+p (P1-$BK_{q+p}$), the P1-$FK_q$ and the P1-$BK_{q+p}$ being encrypted with a time invariant key of the client node;
read the time invariant key from the memory; and
decrypt the P1-$FK_q$ and the P1-$BK_{q+p}$ by use of the time invariant key.

27. The client node of claim 26, wherein the controller is further configured to:
receive, at a time q which is later in time than the time r, a unicast rekey message comprising, for each parent node connecting the client node in the hierarchy of nodes, a parent backward key applicable at a time q+p (P-$BK_{q+p}$), each P-$BK_{q+p}$ being encrypted with a time invariant key of the client node;
read the time invariant key from the memory; and
decrypt each P-$BK_{q+p}$ by use of the time invariant key.

28. The client node of claim 26, wherein the controller is further configured to:
receive, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$;
read the time invariant key from the memory; and
decrypt the $FK_s$ by use of the time invariant key.

29. The client node of claim 26, wherein the controller is further configured to:
receive, at a time s which is later in time than the time r, a unicast rekey message encrypted with a time invariant key of the client node, the unicast rekey message comprising a backward key applicable at a time s+p ($BK_{s+p}$), wherein the $BK_r$ cannot be calculated based on the $BK_{s+p}$;
read the time invariant key from the memory; and
decrypt the $BK_{s+p}$ by use of the time invariant key.

30. The client node of claim 26, wherein the controller is further configured to:
receive, at a time t which is later in time than the time r, a unicast rekey message encrypted with a time invariant key of the client node, the unicast rekey message comprising a backward key applicable at a time t+p ($BK_{t+p}$);
read the time invariant key from the memory; and
decrypt the $BK_{s+p}$ by use of the time invariant key;
wherein applying the first one-way function p times to the $BK_{t+p}$ arrives at a backward key applicable at the time t ($BK_t$) and wherein applying the first one-way function 2p+1 times to the $BK_{t+p}$ arrives as a backward key applicable at a time t−1 ($BK_{t-1}$).

31. A client node in a hierarchy of nodes for acquiring encryption keys, comprising:
a memory configured to store encryption keys; an interface configured to communicate with other nodes of the hierarchy of nodes; and
a controller to control the memory and the interface and further configured to:
acquire, at a time r−1, a first encryption key ($EK_{r-1}$) and a first forward key ($FK_{r-1}$); and
receive, from a key server, at a time r, a backward key applicable at a time r+p ($BK_{r+p}$), the $BK_{r+p}$ being encrypted with the $EK_{r-1}$, p being a period for the hierarchy of nodes;
apply a first one-way function p times to the $BK_{r+p}$ to obtain a backward key applicable at the time r ($BK_r$);
apply a second one-way function to the $FK_{r-1}$ to obtain a backward key applicable at the time r ($FK_r$); and
combine the $FK_r$ with the $BK_r$ to obtain a second encryption key applicable at the time r ($EK_r$ r);
wherein the controller is further configured to:
receive, at a time q which is later in time than the time r, a unicast rekey message comprising, for each parent node connecting the client node in the hierarchy of nodes, a parent backward key applicable at a time q+p (P-$BK_{q+p}$), each P-$BK_{q+p}$ being encrypted with a time invariant key of the client node;
read the time invariant key from the memory; and
decrypt each P-$BK_{q+p}$ by use of the time invariant key.

32. The client node of claim 31, wherein the controller is further configured to:
receive, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$;
read the time invariant key from the memory; and
decrypt the $FK_s$ by use of the time invariant key.

33. The client node of claim 31, wherein the controller is further configured to:
receive, at a time s which is later in time than the time r, a unicast rekey message encrypted with a time invariant key of the client node, the unicast rekey message comprising a backward key applicable at a time s+p ($BK_{s+p}$), wherein the $BK_r$ cannot be calculated based on the $BK_{s+p}$;
read the time invariant key from the memory; and
decrypt the $BK_{s+p}$ by use of the time invariant key.

34. The client node of claim 31, wherein the controller is further configured to:
receive, at a time t which is later in time than the time r, a unicast rekey message encrypted with a time invariant key of the client node, the unicast rekey message comprising a backward key applicable at a time t+p ($BK_{t+p}$);
read the time invariant key from the memory; and
decrypt the $BK_{s+p}$ by use of the time invariant key;
wherein applying the first one-way function p times to the $BK_{t+p}$ arrives at a backward key applicable at the time t ($BK_t$) and wherein applying the first one-way function 2p+1 times to the $BK_{t+p}$ arrives as a backward key applicable at a time t−1 ($BK_{t-1}$).

35. A client node in a hierarchy of nodes for acquiring encryption keys, comprising:
a memory configured to store encryption keys;
an interface configured to communicate with other nodes of the hierarchy of nodes; and
a controller to control the memory and the interface and further configured to:
acquire, at a time r−1, a first encryption key ($EK_{r-1}$) and a first forward key ($FK_{r-1}$);
receive, from a key server, at a time r, a backward key applicable at a time r+p ($BK_{r+p}$), the $BK_{r+p}$ being encrypted with the $EK_{r-1}$, p being a period for the hierarchy of nodes;
apply a first one-way function p times to the $BK_{r+p}$ to obtain a backward key applicable at the time r ($BK_r$);
apply a second one-way function to the $FK_{r-1}$ to obtain a backward key applicable at the time r ($FK_r$); and
combine the $FK_r$ with the $BK_r$ to obtain a second encryption key applicable at the time r ($EK_r$ r);
wherein the controller is further configured to:
receive, at a time s which is later in time than the time r, a unicast rekey message encrypted with a time invariant key of the client node, the unicast rekey message comprising a forward key applicable at the time s ($FK_s$), wherein the $FK_s$ cannot be calculated based on the $FK_r$;
read the time invariant key from the memory; and
decrypt the $FK_s$ by use of the time invariant key.

36. The client node of claim 35, wherein the controller is further configured to:
receive, at a time s which is later in time than the time r, a unicast rekey message encrypted with a time invariant key of the client node, the unicast rekey message comprising a backward key applicable at a time s+p ($BK_{s+p}$), wherein the $BK_r$ cannot be calculated based on the $BK_{s+p}$;
read the time invariant key from the memory; and
decrypt the $BK_{s+p}$ by use of the time invariant key.

37. The client node of claim 35, wherein the controller is further configured to:
receive, at a time t which is later in time than the time r, a unicast rekey message encrypted with a time invariant key of the client node, the unicast rekey message comprising a backward key applicable at a time t+p ($BK_{t+p}$);
read the time invariant key from the memory; and decrypt the $BK_{s+p}$ by use of the time invariant key;
wherein applying the first one-way function p times to the $BK_{t+p}$ arrives at a backward key applicable at the time t ($BK_t$) and wherein applying the first one-way function 2p+1 times to the $BK_{t+p}$ arrives as a backward key applicable at a time t−1($BK_{t−1}$).

38. A client node in a hierarchy of nodes for acquiring encryption keys, comprising:
a memory configured to store encryption keys;
an interface configured to communicate with other nodes of the hierarchy of nodes; and
a controller to control the memory and the interface and further configured to:
acquire, at a time r−1, a first encryption key ($EK_{r−1}$) and a first forward key ($FK_{r−1}$); and
receive, from a key server, at a time r, a backward key applicable at a time r+p ($BK_{r+p}$), the $BK_{r+p}$ being encrypted with the $EK_{r−1}$, p being a period for the hierarchy of nodes;
apply a first one-way function p times to the $BK_{r+p}$ to obtain a backward key applicable at the time r ($BK_r$);
apply a second one-way function to the $FK_{r−1}$ to obtain a backward key applicable at the time r ($FK_r$); and
combine the $FK_r$ with the $BK_r$ to obtain a second encryption key applicable at the time r ($EK_r$ r);
wherein the controller is further configured to:
receive, at a time s which is later in time than the time r, a unicast rekey message encrypted with a time invariant key of the client node, the unicast rekey message comprising a backward key applicable at a time s+p ($BK_{s+p}$), wherein the $BK_r$ cannot be calculated based on the $BK_{s+p}$;
read the time invariant key from the memory; and
decrypt the $BK_{s+p}$ by use of the time invariant key.

39. The client node of claim 38, wherein applying the first one-way function p times to the $BK_{s+p}$ arrives at a backward key applicable at the times ($BK_s$) and wherein applying the first one-way function 2p+1 times to the $BK_{s+p}$ arrives as a backward key applicable at a times−1($BK_{s−1}$).

40. A client node in a hierarchy of nodes for acquiring encryption keys, comprising:
a memory configured to store encryption keys;
an interface configured to communicate with other nodes of the hierarchy of nodes;
and a controller to control the memory and the interface and further configured to:
acquire, at a time r−1, a first encryption key (EKr−1) and a first forward key (FKr−1);
receive, from a key server, at a time r, a backward key applicable at a time r+p (BKr+p), the BKr+p being encrypted with the EKr−1, p being a period for the hierarchy of nodes;
apply a first one-way function p times to the BKr+p to obtain a backward key applicable at the time r (BKr);
apply a second one-way function to the FKr−1 to obtain a backward key applicable at the time r (FKr); and
combine the FKr with the BKr to obtain a second encryption key applicable at the time r (EKr r);
wherein the controller is further configured to:
receive, at a time t which is later in time than the time r, a unicast rekey message encrypted with a time invariant key of the client node, the unicast rekey message comprising a backward key applicable at a time t+p (BKt+p);
read the time invariant key from the memory; and
decrypt the BKs+p by use of the time invariant key;
wherein applying the first one-way function p times to the $BK_{t+p}$ arrives at a backward key applicable at the time t ($BK_t$) and wherein applying the first one-way function 2p+1 times to the $BK_{t+p}$ arrives as a backward key applicable at a time t−1 ($BK_{t−1}$).

* * * * *